(12) United States Patent
Smith

(10) Patent No.: US 8,682,888 B2
(45) Date of Patent: Mar. 25, 2014

(54) SYSTEM AND METHODS FOR TASKING, COLLECTING, AND DISPATCHING INFORMATION REPORTS

(75) Inventor: Joseph C Smith, Herndon, VA (US)

(73) Assignee: Joseph Smith, Herndon, VA (US)

(*) Notice: Subject to any disclaimer, the term of this patent is extended or adjusted under 35 U.S.C. 154(b) by 64 days.

(21) Appl. No.: 13/325,096

(22) Filed: Dec. 14, 2011

(65) Prior Publication Data

US 2013/0159330 A1 Jun. 20, 2013

(51) Int. Cl.
*G06F 7/00* (2006.01)
*G06F 17/30* (2006.01)

(52) U.S. Cl.
USPC .......................... 707/724; 707/728; 707/733

(58) Field of Classification Search
USPC ......................................... 707/724, 728, 733
See application file for complete search history.

(56) References Cited

U.S. PATENT DOCUMENTS

2003/0115215 A1* 6/2003 Swarovski ................. 707/104.1
2006/0168185 A1* 7/2006 McCall et al. ................ 709/223
2011/0276423 A1* 11/2011 Davidson .................... 705/26.1

* cited by examiner

*Primary Examiner* — Mariela Reyes

(57) ABSTRACT

A system for tasking, collecting, storing, and dispatching time-sensitive location-based information reports via an electronics communication network, comprising a central relational database management system, multiple computer-implemented services, and applications residing on computer-based mobile communication devices. The system provides: methods to convey the value of specific types of geospatial time-sensitive information from a world-wide population of information consumers to a world wide population of "eye witness" reporters (i.e. suppliers); methods to collect payment from the consumers and, in turn, pay the suppliers of valid information reports that satisfy a consumers' specific criteria; methods to distribute streams of geospatial-based information reports to geospatial viewing applications; methods to aggregate information demand from multiple information-tasking subscriptions; methods to subscribe and receive alerts with regards to tasking subscriptions; and methods to validate and score information reports.

24 Claims, 30 Drawing Sheets

210

| Criteria Weighting Table ||
| Criteria | Weight |
| --- | --- |
| Reporter Satisfaction Rating | 4 |
| Reporter Class | 3 |
| Report Freshness | 5 |
| Catch Rate | 5 |
| Birds Working | 3 |
| Bait Pods Observed | 4 |
| Fish Length | 2 |
| Fish Weight | 1 |
| et. al. criteria | |

Figure 15

| Accounts Table |
|---|
| | UserID |
| | Balance |
| | TotalSubscriptionPledges |
| | et. al parameters |

SYSTEM AND METHODS FOR TASKING, COLLECTING, AND DISPATCHING INFORMATION REPORTS

FIELD OF INVENTION

The present invention relates generally to mobile communication devices and Internet-based application services, in particular to a system of methods for tasking, collection, and dispatch of time-sensitive location-based information reports, and more particularly, matching buyers with sellers of information reports.

BACKGROUND

While the Internet and the World Wide Web have provided the means to share information, there is not a means to task users for specific time-sensitive and location-based data. User Group/Bulletin Board type websites provide the capability for users to post specific domain information (e.g. birding sites allows users to post bird sightings) and receive email notices of postings. Using the birding domain, bulletin board type web sites accept free form reports (sometimes via email) without specific times, location, and species of bird sightings. A birder, who may only be interested in the sightings of one particular species (e.g. Green Heron) in a particular location near his or her home, is required to read through all the postings, of which none may provide actionable intelligence . . . that is, the necessary information for the birder to locate and spot the desired bird species.

Many existing alert systems require "person in the loop" filtering before dispatched reports are issued to subscribers. These basic systems require a person to screen through emails, text messages, Facebook postings, etc., before an official alert is posted. Although the "person in the loop" adds effective quality control and validation of the information, the manual intervention greatly delays the delivery of the information to consumers.

Traffic-based alerting systems have the ability to provide users time-sensitive and location-based reports, but they rely heavily on sensor networks and are not reliable for collecting information that can more easily be gathered via first hand eye witness means (i.e. a worldwide sensor network for spotting and tracking birds cannot easily be built).

Web-based auction systems, like eBay, have provided a powerful means for connecting sellers of merchandise with a world-wide buying community. Similar to an online auction system, a need exists to connect subscribers (i.e. buyers and consumers) of time-sensitive location-based information to a worldwide community of "eye witness" information reporters (i.e. sellers). Most people are completely unaware of the value of their daily personal observations. The information becomes even more valuable when it can be delivered to a buyer in a timely, orderly, and coherent fashion. In addition to the small tidbits of information desired by individual consumers, aggregated information is deemed highly valuable to others including government organizations, NGOs, academia, and commercial entities. Structured data maintained in a relational database system creates value to these organizations in its ability to be trended and sifted for shifts and patterns. Example research includes fisheries management, wildlife management, storm tracking, data supporting global warming research, etc.

SUMMARY

The present invention discloses various embodiments of a system that is capable of tasking, collecting, storing, and dispatching time-sensitive location-based information reports. These information reports are based on first hand "eye witnessed" events, also referred herein as reports and/or personal observations. The System provides the means to convey the value of (i.e. demand for) specific types of geospatial time-sensitive information from a world-wide population of information consumers to a world-wide population of eye witness reporters (i.e. suppliers). The System provides the means to collect payment from the consumers and pay the suppliers of information reports that satisfy a consumer's specific criteria.

The System is unique in its ability to task a world-wide population for time-constrained and location-constrained information reports. For example, an academic institution performing environmental research on a particular ecosystem (e.g. the Chesapeake Bay) may want to monitor erosion over the course of several years at various locations. Whereas current practice might require a research team member to drive (or boat) to all these locations quarterly to take pictures and record simple measurements, this invention will enable the organization to task the general populace to take the pictures and gather the data at these sites at their specified time intervals. The research organization would offer a payment to the populace less than the cost of sending out one of their own team members, thus insuring that a satisfied information report saves them money. Via the System, reporters are able to query or subscribe to existing tasking within geographic regions for which they might be interested in collecting information specified by specific subscriptions, such as the one cited in this example. The reporter, thus seeing a subscription for an environmental picture(s) of a shoreline within a short distance of his location, would then go out and photograph the shoreline. The pictures would then be submitted into the System as part of an information report with other tasked metadata. Based on inherent trust mechanisms built into the System, and/or declared satisfaction by the research institution who initiated the tasking, the reporter would be paid the designated bounty fee through the System. Tremendous cost savings for the research project would be realized.

The invention provides a process for recording geospatial time-sensitive and domain metadata at the time of a report submission, which, in turn, enables the System to issue reports to subscribers near-real time without the need for a "person in the middle" filtering based on reporter trust mechanisms.

The invention is unique in that it is able to pool subscriptions based on unique domain criteria, time range effectivity, and geographic regions. Based on the aggregation of subscription metadata, reporters are able to receive up to the minute collection tasking by location and specific domain metadata criteria.

The invention differentiates itself from current practices by its ability to eliminate "person in the middle" filtering by automatically validating incoming reports via technical embodiments of the invention. The invention provides the capability to aggregate incoming like reports until tunable trust thresholds are met, and then to dispatch an alert. For example, if a novice birder supplies an information report with regards to the sighting of a Grasshopper Sparrow (a sparrow that may be confused with several other similar sparrows), the invention has the ability to withhold dispatch of the sighting until corroboration is provided by additional reports of sightings of the Grasshopper Sparrow in the same general vicinity by other birders.

The present invention discloses grouping of information reports into many types of information domains and subdomains. A general domain example, "Wildlife", is one that captures personal observations experienced in the wild, such as the observation of a polar bear, noting the time, location, and other anecdotes of the observation (which may include pictures and videos). An example of a sub-domain of Wildlife is "Birding", which would capture real time sightings, counts, and behavior of specific bird species.

In some implementations, a computer-implemented website interface is used to collect metadata pertaining to a specific domain information report. The website permits the user to identify the location of the observation by entering the latitude and longitude. In some implementations, the website permits the user to select the location by pre-defined locations with known latitude and longitudes. The website allows the user to enter time of observation. The computer-implemented website additionally records the time of submittal of the information report derived from the server computer time. The computer-implemented website provides fields of pre-defined metadata that describes the pre-defined domain information report (e.g. bird species, size, sex, count, etc.). The computer-implemented website provides free form text fields to permit free form text descriptions of the observation. In one embodiment, the computer-implemented website provides the capability for information reporters to input media attachments such as pictures, video, and/or audio files that might supplement, and in some cases substantiate, an information report.

In some implementations, a mobile application is implemented on a hand held device, such as a smartphone, to enable a user to submit an information report. The mobile application is capable of capturing location information from built in GPS services of the device and/or other commercially available location look up services based on Wi-Fi access points, WiMAX, or cell tower data. The mobile application provides built in camera, video, and audio features to automatically submit these collections with the information report. The mobile application provides a Graphical User Interface (GUI) for the user to select pre-defined specific domain related metadata that may be used to satisfy information-tasking subscriptions.

Under another aspect of the invention, the System includes computer-implemented logic that determines if incoming information reports satisfy information-tasking subscription criteria that include location boundaries, time ranges, and specific domain related identifiers. Information reports are then formatted and dispatched to the subscription's specified communication medium (e.g. email, text message, etc).

Under another aspect of the invention, the System includes computer-implemented logic for dispatching reports to subscribers based on subscriber-selected communication methods (and destination addresses) that include, but not limited to, SMS text messages, emails, pager text messages, Twitter, Facebook, and computer-generated telephone calls.

Under another aspect of the invention, the System includes computer-implemented logic for querying and presenting information reports on a webpage in textual and geospatial formats.

Under another aspect of the invention, the System includes computer-implemented logic for streaming information reports to geospatial display applications such as Google Earth, navigation systems, fish finders, etc.

Under another aspect of the invention, the System includes computer-implemented logic to allow users to subscribe to time and location-based information reports specific to a domain with additional filtering criteria. (e.g. bird species, size, sex, color, count, etc.). The invention includes web-based forms for processing the user input and enabling submission to a subscription service.

Under another aspect of the invention, a computer-implemented mobile application is employed to enable users to subscribe to time and location-based information reports specific to a domain with additional filtering criteria. (e.g. bird species, size, sex, color, count, etc.). The invention includes the ability of the server to push to the mobile application the domain criteria definitions and the list of user selections for those criteria.

Under another aspect of the invention, the System includes computer-implemented logic for aggregating subscriptions for the purpose prioritizing the tasking of information reports. For example, if five subscribers request sightings of a Great Blue Heron in Central Park on July $4^{th}$, and two subscribers request sightings for a Green Heron in Central Park on July $4^{th}$, each having paid $1 for a subscription, then the bounty value attributed to tasking for a Great Blue Heron sighting in Central Park would be set to $5 and the bounty for a sighting report of a Green Heron to $2. The System then provides this "bounty" value to subscribed information reporters via email, text message, and/or the server website.

Under another aspect of the invention, the System includes computer-implemented logic that dispatches collection tasking updates to information reporters. The System provides computer-implemented logic that enables an information reporter to subscribe to domain criteria specific tasking updates and to receive those updates in a specified manner (e.g. email, txt message, mobile app notification, etc.). Using the bird watching domain example above, a bird sighting reporter may subscribe to all tasking updates for the boundaries of Central Park for July $4^{th}$. The reporter in turn would receive updates through the course of the day for the aggregate bounty on both species. If the reporter only submitted to receive tasking updates for Great Blue Herons, the tasking updates would be limited for that species.

Under another aspect of the invention, the System includes computer-implemented logic that weights and scores information reports based on defined metadata supplied by the report.

Under another aspect of the invention, the System includes computer-implemented logic that allows subscribers to use a report's "score" as a minimum threshold criteria for transmittal.

Under another aspect of the invention, the System includes computer-implemented logic that allows subscribers to review and provide feedback on received reports.

Under another aspect of the invention, the System includes computer-implemented logic that maintains ranks and metrics on reporters based on the number and quality of supplied reports to the System.

Under another aspect of the invention, the System includes computer-implemented logic that allows a domain administrator to set trust levels of registered reporters enrolled in the System. Via the set trust level, the System is able to immediately release incoming reports for dispatch if the source reporter's trust level meets the trust threshold for releasable reports.

Under another aspect of the invention, the System includes computer-implemented logic that aggregates similar reports (based on geospatial, time, and domain metadata) and pools them in a holding queue if they individually do not meet thresholds for dispatch. The System is capable of increasing the trust level of reports based on the aggregation of similar reports, thus exceeding the dispatch threshold, and resulting in the dispatch of the individual reports and/or the dispatch of an aggregated report.

Under another aspect of the invention, the System includes computer-implemented logic that aggregates similar reports (based on geospatial, time, and domain metadata) into one combined report and dispatches it.

Under another aspect of the invention, the System includes computer-implemented logic that provides information reports to geospatial viewer applications and devices such as Google Earth, navigation systems, fish finder systems, and other map-based viewers. Available reports are provided to these geospatial viewing applications and devices based on a subscriber's subscription privileges, paid services, geospatial range filtering, and domain metadata filtering. The System interfaces with the geospatial viewing tools via published and available application program interfaces (e.g. Google Earth network links).

Under another aspect of the invention, the System includes computer-implemented logic that enables electronic payments for report collection tasking.

Under another aspect of the invention, the System includes computer-implemented logic that pays reporters for satisfied collection tasking, whether directly credited to an account, or via an external payment system (e.g. PayPal).

Under another aspect of the invention, the System includes computer-implemented logic that updates subscription range criteria automatically based on GPS and location lookup features built into the mobile computing device of the subscriber. The invention provides the capability for a subscriber to indicate whether their range criteria is dynamic, based on their real-time location during the time effectivity of the subscription.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

FIG. 15 illustrates an example embodiment of a tunable weighting table used in the ComputedScore formula.

FIG. 23 is an illustration of a database table schema used to store financial account information for subscribers and reporters.

DETAILED DESCRIPTION

This document describes methods and systems for tasking, collection, and dispatch of time-sensitive location-based information reports.

Figure 1:
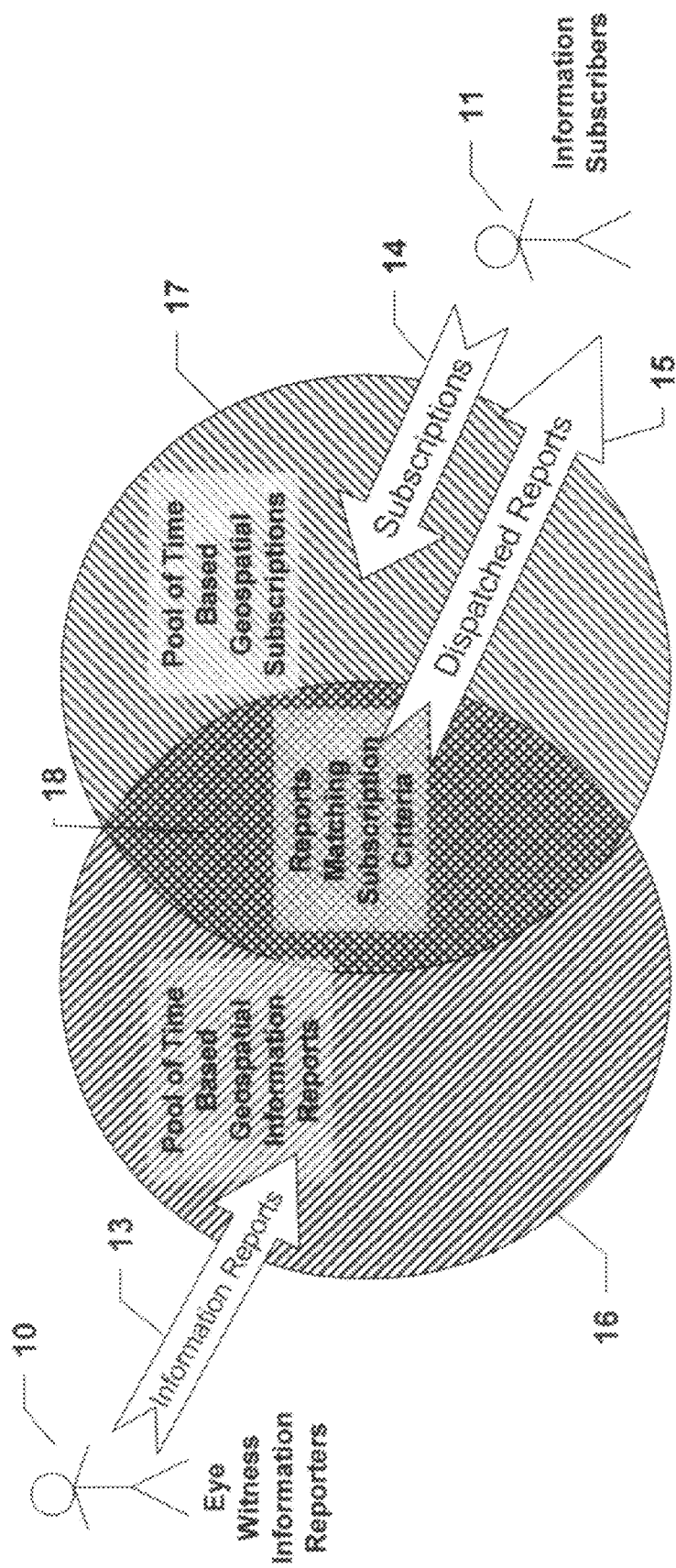
FIG. 1 illustrates the concept of matching a pool of time-based geospatial information reports against a pool (or collection) of time-based geospatial information-tasking subscriptions.

FIG. 1 identifies the underlying logic of matching a pool of time-based geospatial information reports 16 against a pool (or collection) of time-based geospatial information subscriptions 17. Subscriptions 14 are generated and submitted by Information subscribers 11. As information reports 13 are created and submitted by eye witness information reporters 10, the System dispatches reports 15 based on those reports that match subscription criteria 18. Dispatched reports 15 are transmitted to the subscribers 11 whose criteria matched the correlating metadata of a particular information report. A world-wide population of information reporters receive "tasking" because the invention makes visible to them the subscription pool 17 of desired time-based geospatial tasking criteria. As will be later explained, the invention communicates the information demand in a relational, organized, and searchable manner.

Since the System does not make visible all existing information reports to a potential subscriber without payment (which could come from a third party, e.g. advertisers), subscribers are inclined to request the information and be rewarded with immediate information matches from the existing information reports pool 16. If a match for the information does not exist in the information reports pool 16, the addition of an information-tasking subscription 14 will increase demand for the specified information, and thus, the likelihood will increase that an information reporter 10 will release existing information or collect it. In this regard, the System is self-feeding.

As an example from the Wildlife-Fishing sub-domain, consider a fisherman who has found a good spot while fishing for a particular fish species. He is unlikely to give away his location to another fisherman because that information has the potential to jeopardize his continuing capability to catch fish. At some point, the aggregate demand by other less fortunate anglers may become strong enough that the successful angler will give up his information when the price reaches a certain threshold.

Figure 2:
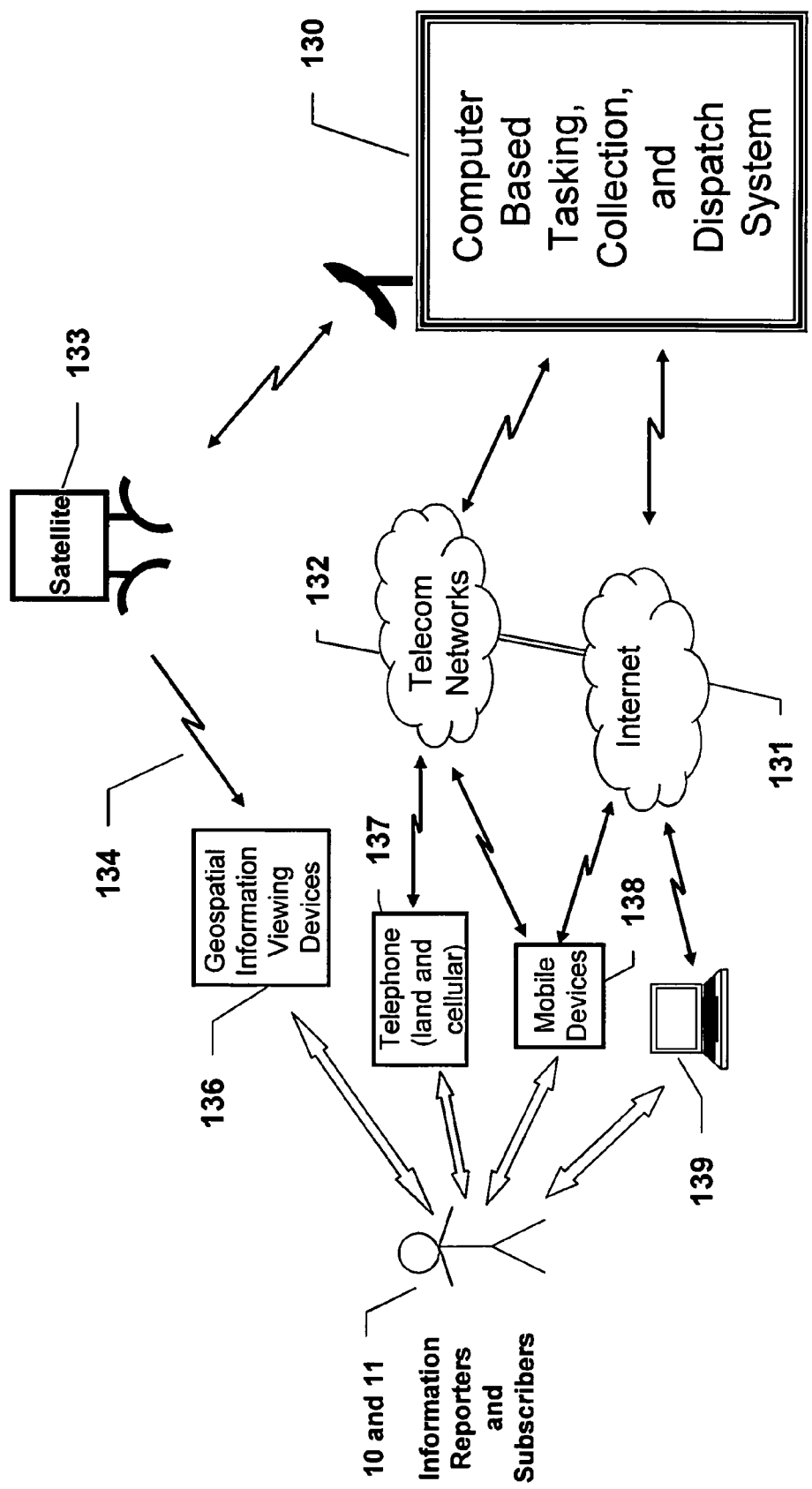
FIG. 2 illustrates the communication infrastructure context of the invention.

FIG. 2 illustrates the communication infrastructure context of the invention. The computer-based tasking, collection, and dispatch System 130 is shown with electronic communication interfaces with the Internet 131, telecommunication networks 132, and satellite-based communication networks 133. Information reporters 10 and subscribers 11 are shown interacting with a host of communication devices to include personal computers 139, mobile devices 138, telephones 137, and other unique geospatial information viewing devices (e.g. navigation systems). The computer-based collection, tasking, and dispatch System 130 is composed of servers, data storage, and communication interface devices. The mobile device 138 shown in the figure represents a class of mobile computing devices (e.g. smartphones, iPads, iPhone, and Pocket PCs) capable of communicating to the System 130 via several mechanisms to include cellular communications networks and the Internet 131. The mobile devices 138 and the personal computer devices 139 provide a human interface mechanism for reporters 11 to submit information reports. They likewise provide subscribers 11 the ability to interface with the System 130 to create subscriptions and receive information reports. The telecom networks infrastructure 132 represents both land-based telephony systems, satellite, and cellular telephony systems. Item 137 represents a land-based telephone capable of receiving recorded dispatch reports. Downlink 134 represents a one-way satellite broadcast that communicates to unique geospatial viewing devices 136 such as navigation traffic systems.

Figure 3:
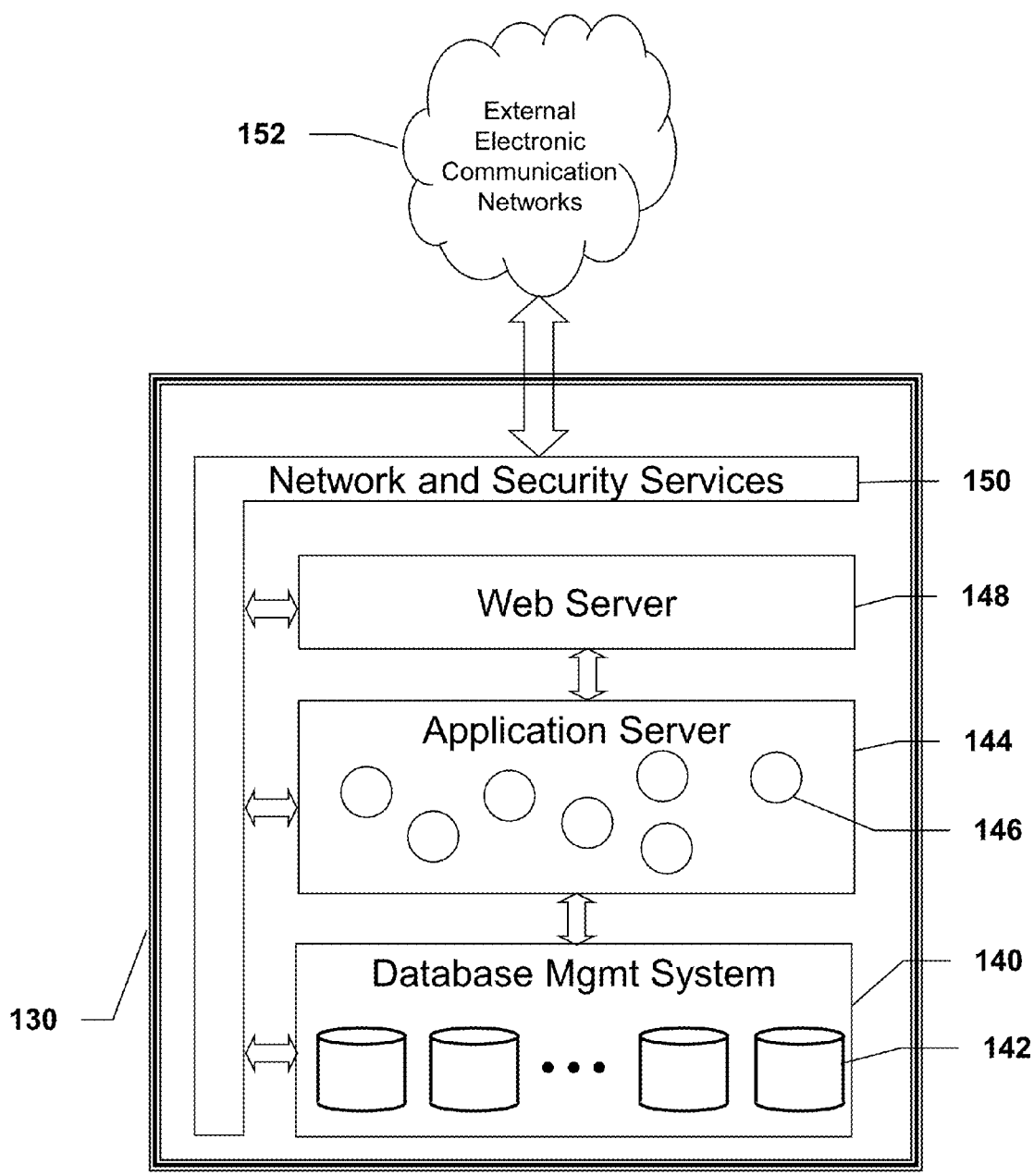
FIG. 3 illustrates major system components of a computer-based tasking, collection, and dispatch system.

FIG. 3 illustrates the major components and building blocks for implementation of a computer-based tasking, collection, and dispatch System 130. The System 130 contains an underlying Relational Database Management System (RDBMS) 140 with interacting relational database tables 142. The System 130 contains an Application Server 144 hosting unique computer-implemented services 146. The System 130 contains a web server 148 to host web services which can include web page hosting, communication with application system services 146, interface with the RDBMS 140, and other inherent services. The System 130 implements network and security services 150 to provide communication interface services with the external networks 152. The network and security services 150 also provide internal security and communication services for the major building blocks of the System, 140, 144, and 148.

Figure 4:
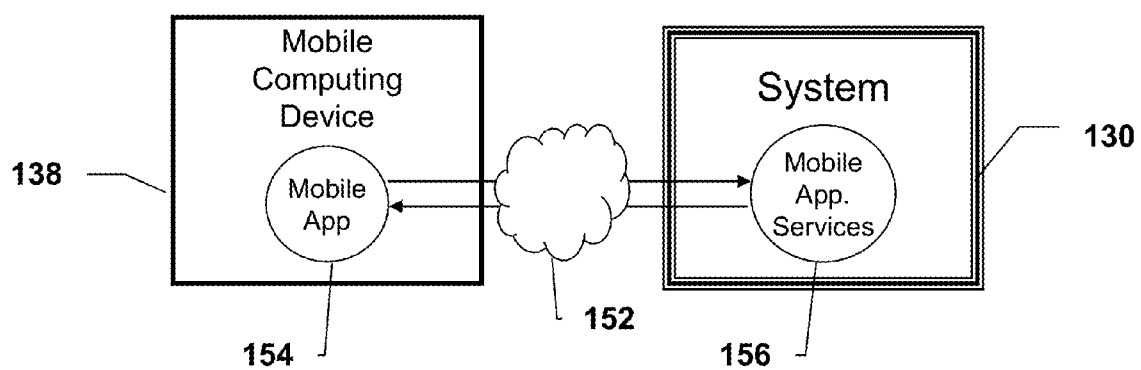
FIG. 4 illustrates an example implementation of mobile application interfaces to the computer-based tasking, collection, and dispatch system.

FIG. 4 illustrates an example embodiment of a computer-implemented Mobile Application Service 156. The service 156 communicates over an electronic communications network 152 with mobile applications 154 hosted on mobile computing devices 138 (e.g. smartphone). The mobile application 154 provides computer-implemented methods for reporters and subscribers to interact with the computer-based tasking, collection, and dispatch System 130. Services and devices integrated into existing smartphones enable electronic signature parameters such as latitude and longitude via built in GPS and/or built in location lookup capability, network derived time stamps, phone number, cellular tower metadata, cellular handset identifiers (e.g. IMSI, IMEI, MSN), network MAC address, network IP address, and built in biometric signatures to be delivered with an information report.

Figure 5:
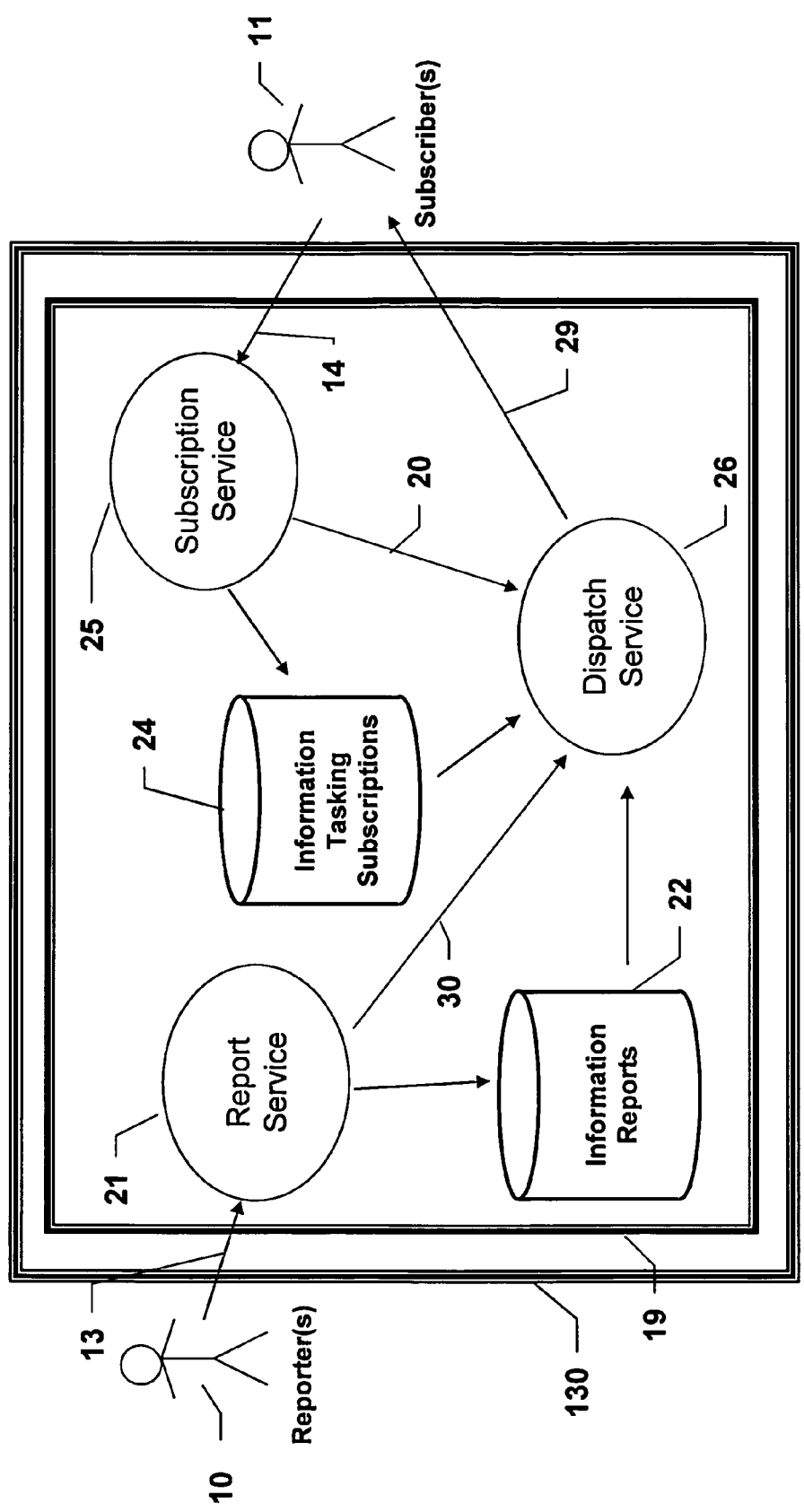
FIG. 5 illustrates an example implementation of the Report, Subscription, and Dispatch services within the computer-based tasking, collection, and dispatch system.

FIG. 5 illustrates an example implementation and interaction of a Report Service 21, Subscription Service 25, and a Dispatch Service 26 within the computer-based tasking, collection, and dispatch System 130. Perimeter 19 around the System 130 represents underlying non-unique (e.g. existing art) services and interfaces into the System to include web interface services, network interface services, security services, application services, and database management system services diagrammed in FIG. 3. The System 130 provides mobile application and web-based graphical user interface services via a Report Service 21 to reporters 10 which enable the submission of time-based geospatial reports 13. The Report Service 21 communicates 30 with the Dispatch Service 26 upon arrival of new reports into the System 130. The System 130 provides a mobile application and web-based interface services via a Subscription Service 25 to enable subscribers 11 to submit time-based geospatial information subscriptions 14. The Subscription Service 25 notifies 20 the Dispatch Service 26 upon the arrival of all new subscriptions into the System 130. All reports and subscriptions are recorded into logical tables of a Relational Database Management System (RDBMS) shown respectively as items 22 and 24. A Dispatch Service 26 performs the logical matching of reports against subscriptions and then issues reports 29 back to subscribers 11.

In one implementation of the invention, the Report Service 21 receives electronic device signature data from the reporter's 10 computing device as explained in the description of FIG. 4. If the latitude and longitude is provided from the device, it is used to validate the latitude and longitude provided with the information report. Other device signature parameters are compared with signature parameters stored by the System 130 upon a reporter's original enrollment to the System 130 and previous usage patterns. The logical comparison of these parameters may be used to prevent dispatch of fraudulent considered.

Figure 6A:
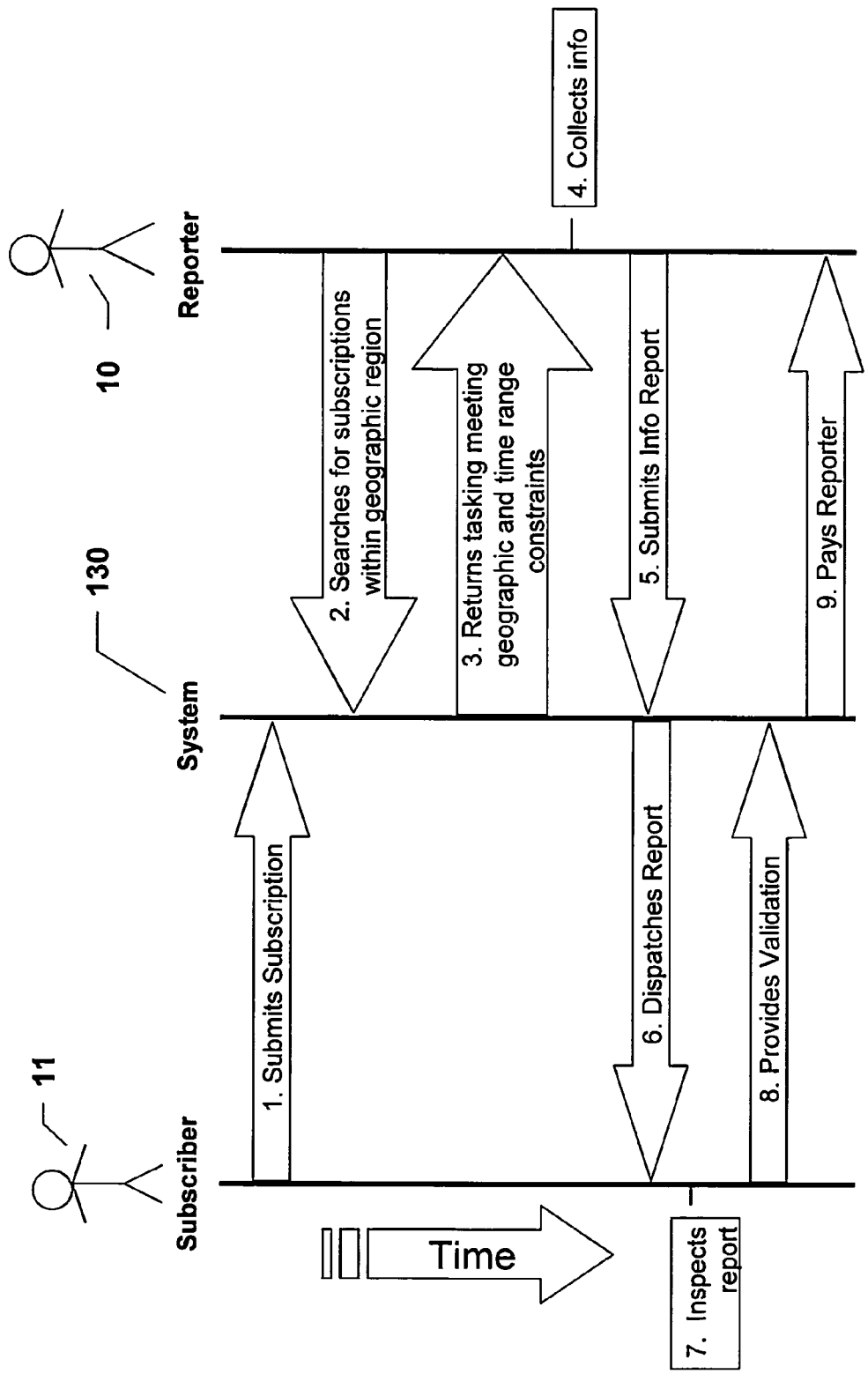
FIG. 6A illustrates an example human interaction diagram with the system highlighting a sequence of tasking and subscription satisfaction.

FIG. 6A illustrates an example human interaction diagram with the System 130 highlighting the sequence and process of tasking the System 130, and performing manual subscription satisfaction. This diagram shows an example of human interaction with the computer-based tasking, collection, and dispatch System 130. The illustration identifies the invention's logic and process of receiving tasking from subscribers 11 via information-tasking subscriptions, tasking reporters, collecting information reports, and paying reporters 10.

Step 1: The process begins with a subscriber 11 submitting a subscription to the System 130. The subscription contains specific domain criteria, time range effectivities, geographic range constraints, and a payment obligation.

Figure 6B:
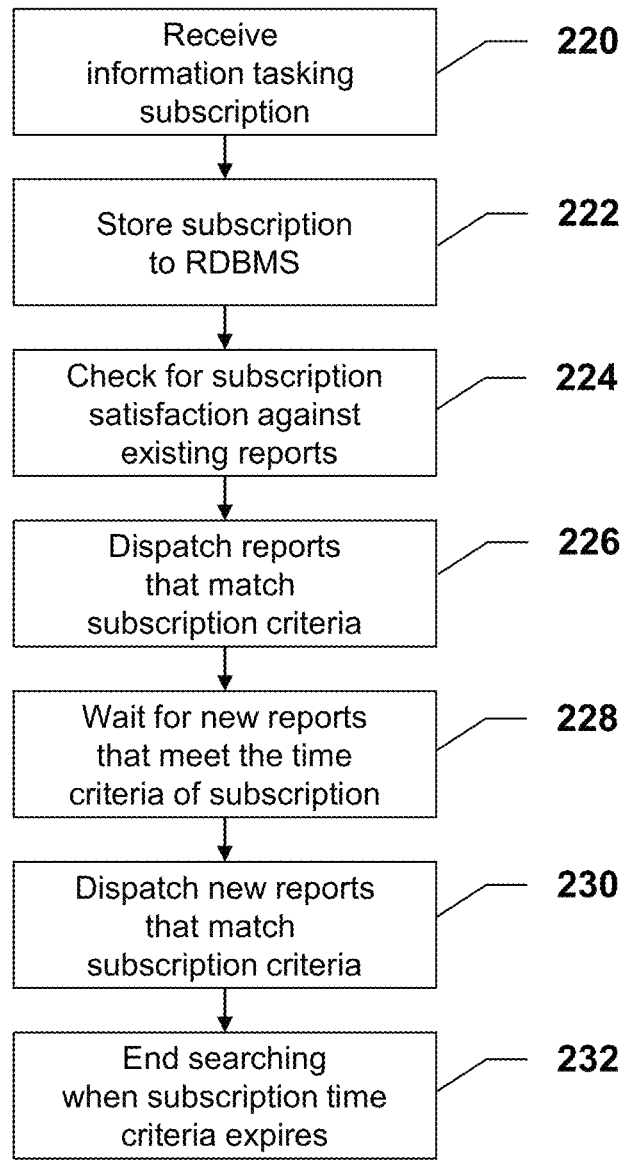
FIG. 6B is a flowchart illustrating the logic used to process an information-tasking subscription.

The receipt of the subscription by the System 130, initiates a process as illustrated in FIG. 6B.

Step 2: Sometime later, a reporter 10 logs into the System 130 and performs a geographic regional query for existing subscriptions.

Step 3: The System 130 returns/displays all tasking (subscription information) that meet the reporter's time and range constraints. The reporter determines that he/she has access to the target information of a subscription (or potentially aggregated subscriptions).

Step 4: The reporter 10 goes out to the field (if not already present), and collects the desired information (e.g. a picture, eye witness report, weather observation, etc.).

Step 5: The reporter 10 submits the information report to the System 130 via implementations of the invention (e.g. mobile application, browser, etc.). The process conducted by the System 130 upon receipt of the information report is detailed in the flow chart of FIG. 6D.

Step 6: The System 130 receives the report and automatically determines that it fits the criteria of an existing information subscription. The System 130 dispatches the report to the subscriber 11. Although this example diagram shows a dispatch to only one subscriber, had more subscribers been looking for the same information, dispatches of the report would also have been delivered to them.

Step 7: The subscriber 11 receives the report on a host of any devices (e.g. smartphone, home computer, etc.). The subscriber 11 inspects the report to determine that the report accurately meets the criteria of the subscriber's tasking.

Step 8: Following inspection of the report, the subscriber 11 submits a validation message to the System 130 indicating that the received report is considered valid.

Step 9: The manual validation of the individual report results in the System 130 issuing an electronic payment (or credit) to reporter 10 and a deduction from the account of the subscriber 11.

Figure 6C:
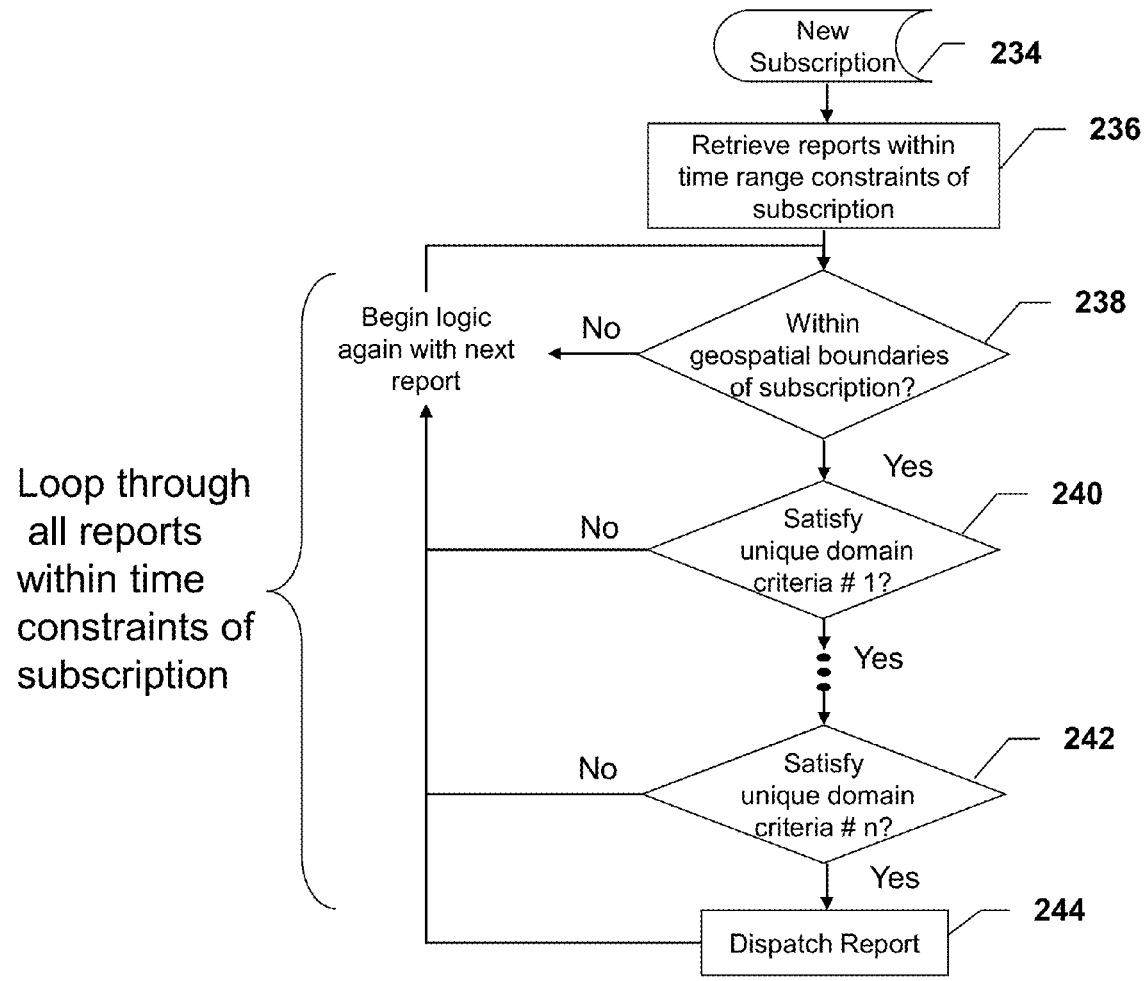
FIG. 6C is a flowchart illustrating the logic used to process a newly received information-tasking subscription against existing information reports.

FIG. 6B is a flowchart illustrating the logic used in one embodiment of the invention to process an information-tasking subscription. The process begins with step 220, in which the System 130 receives the submittal of the information tasking request from the subscriber. In step 222 the information-tasking subscription is stored to the RDBMS. In step 224, the subscription criteria are checked for satisfaction against all previously received information reports as illustrated in FIG. 6C. In step 226, existing reports that match the subscription criteria are dispatched to the subscriber. In step 228, the System 130 waits for new reports that fall within the time constraints of the subscription. In step 230, reports matching the remaining subscription criteria are dispatched. Until the time criteria of the subscription passes, step 230 shows that new incoming reports matching the subscription criteria are dispatched to the subscriber. Step 232 shows the end of the searching process when the current time is later than the subscription time criteria. In one embodiment of the invention, the subscription effective end time is the sum of the subscription end time and FreshnessTolerance as shown in the following formula:

Effective End Time=Subscription End Time+FreshnessTolerance

In one embodiment, the lag time is a tunable System parameter. In another embodiment it is specified in the information-tasking subscription as specified by the subscriber. The addition of the FreshnessTolerance time span to the subscription end time allows for reports that document observations within the time subscription time range, but received at some time later than the subscription end time, to still be dispatched to the subscriber. For example, if a subscription is specified with the time range of July $4^{th}$ 12:00 AM→July $5^{th}$ 12:00 AM and a report is received by the System on July $5^{th}$, 9:00 AM for an documented observation that occurred on July $4^{th}$, the report may still be dispatched depending on the FreshnessTolerance setting. If the subscriber was willing to accept some delay in receiving the report from the actual observation time, say half a day, then the report would be dispatched. If the subscriber was unwilling to accept a delay beyond an hour, in this example, the report would not be dispatched.

FIG. 6C is a flowchart illustrating the logic used in one embodiment of the invention to process a newly received information-tasking subscription against existing information reports. The process begins with step 236, in which the System 130 receives a new information-tasking subscription 234. In step 236 the System 130 performs a search of all existing information reports that meet the time constraints specified in the subscription 234. The System 130 then loops through each of these information reports checking for reports which meet the remaining subscription criteria. In step 238, a report is checked for meeting the geospatial constraints of the subscription. In steps 240 and 242, the report is checked for meeting all of the remaining constraints of the subscription. If any of the criteria are not met for a particular report, the process moves to the next report in the loop. If a report meets all the criteria of the subscription, the report is dispatched as shown in step 244. When all the reports have been checked for subscription satisfaction, the process ends.

Figure 6D:
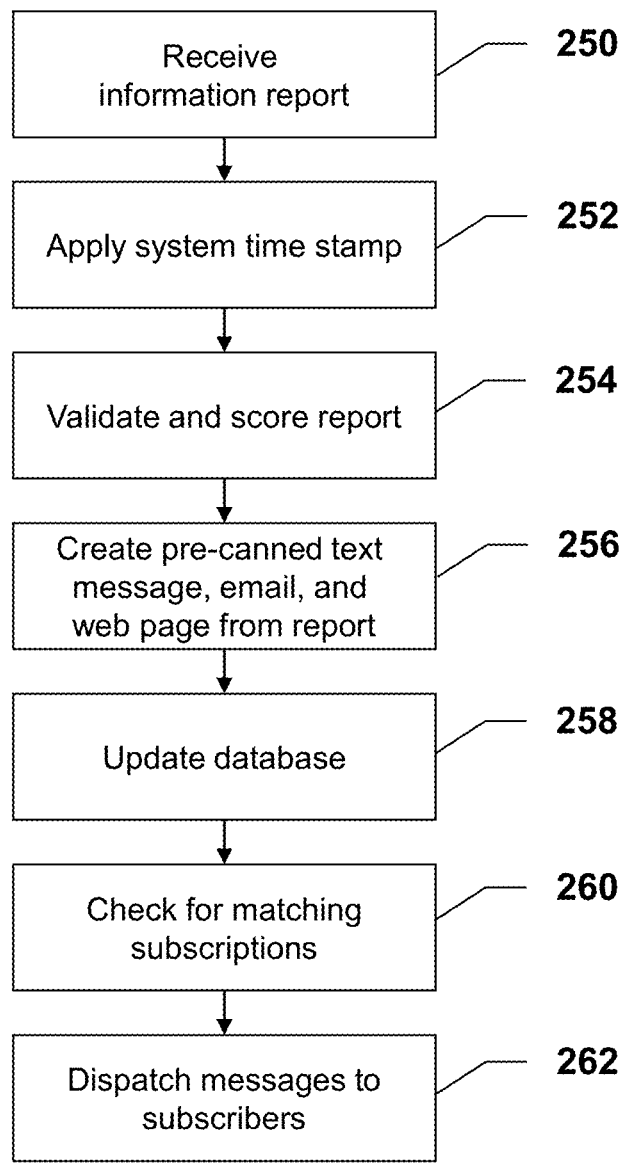
FIG. 6D is a flowchart illustrating the logic used to process an incoming information report.

FIG. 6D is a flowchart illustrating the logic used in one embodiment of the invention to process an incoming information report. The process begins with step 250 in which the System 130 receives an information report. Upon receipt of the report a time stamp is applied in step 252. In step 254 the report is validated and scored as explained in the description of FIG. 15. In step 256 pre-canned text messages, email bodies, and web pages are created from the metadata supplied from the information report. In step 258 the RDBMS 140 is updated with the information report and other metadata created by the System 130 in steps 252, 254, and 256. In step 260 the new report is sent to the Dispatch Service 26 where it is checked against existing information-tasking subscriptions. The process of checking the new report against existing subscriptions is detailed in the flow chart illustrated in FIG. 10. The process ends with the dispatch of messages to subscribers whose information-tasking subscriptions' criteria were fulfilled by the report.

Figure 7:
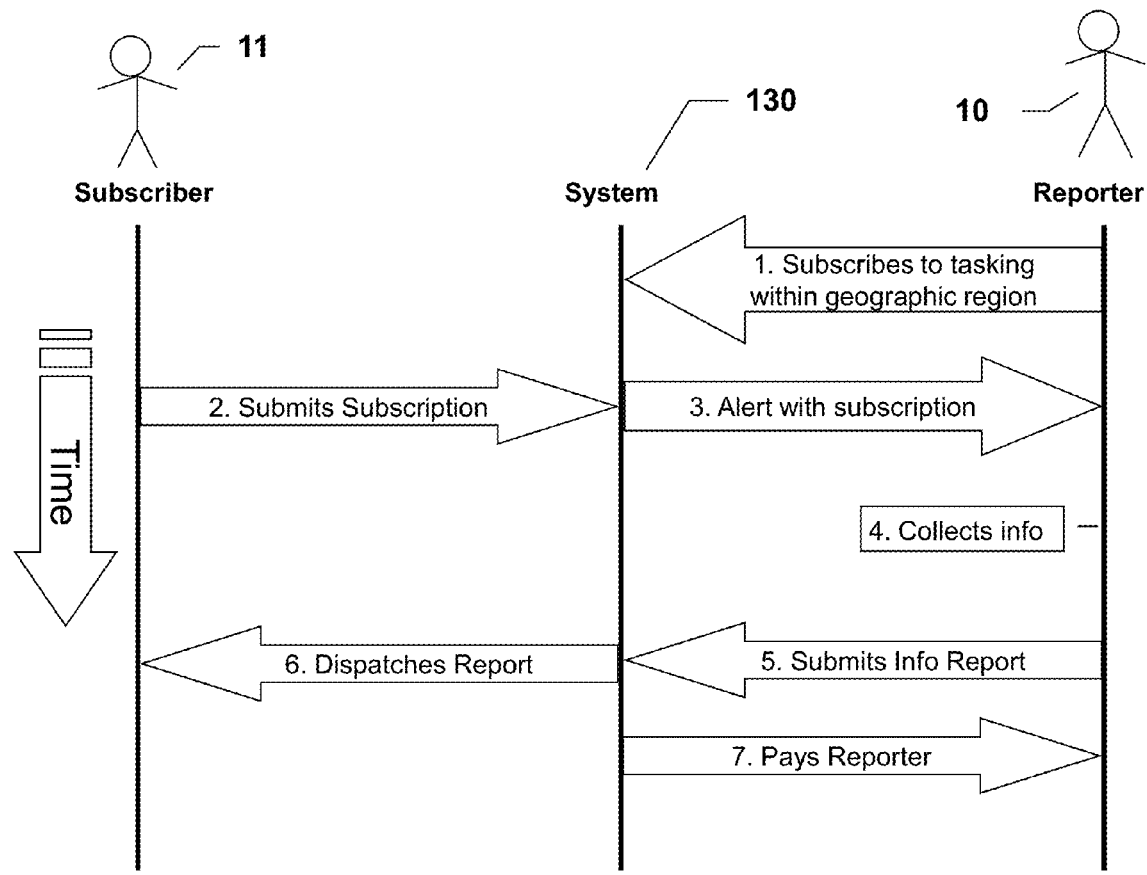
FIG. 7 illustrates an example human interaction diagram with the system highlighting a subscription alert and automatic payment sequences.

FIG. 7 illustrates an example human interaction diagram with the System 130 highlighting a subscription alert and automatic payment sequences. The illustration identifies the invention's logic and process of dispatching subscription alerts to reporters. It also displays the invention's process and logic for issuing automatic payments (or credits) based on report submissions.

Step 1: The process begins with a reporter 10 submitting a subscription for tasking to the System 130. This subscription contains specific domain criteria, time range effectivities, and geographic range constraints for incoming tasking. This subscription should not be confused with an information report subscription, which is a tasking request for information. The subscription submitted in this diagram is one that is used to make a request of the System 130 to alert a reporter 10 when information tasking is received by the System 130 that matches the reporter's collection constraints (e.g. time, location, and type of information). For example, reporter 10 might limit the geographic range constraints to 20 miles from his place of residence, time constraints only on a weekend, and domain constraints to birds.

Step 2: Later a subscriber 11 submits an information-tasking subscription that matches constraints of the reporter's tasking subscription from Step 1.

Step 3: The System 130 automatically determines that the incoming information-tasking subscription matches constraints of an existing reporter's tasking subscription, and thus issues an alert to the reporter 10. The alert issued to the reporter provides the information tasking. The information tasking will be a subset of the reporter's constraints, and, at most, a perfect match. For example, the incoming information subscription may identify a range for an entire state, specify a unique rare bird species (e.g. Ivory-billed Woodpecker), and an unlimited time effectivity.

Step 4: Assuming the reporter 10 is able to collect the desired tasking of the alert information subscription, the reporter 10 collects the information (e.g. bird sighting, picture, sound recording, etc.).

Step 5: Upon completion of the information tasking, the reporter 10 submits an Information Report to the System 130.

Step 6: Upon receipt of the information report, the System 130 automatically dispatches the report to the subscriber 11. If more than one person subscribed to the information, they would all likewise receive information report dispatches.

Step 7: Using built in trust mechanisms, the System 130 automatically determines authenticity of the report and subscription satisfaction. The System 130 automatically calculates payment due (or credit) to the reporter 10. The System 130 issues an electronic payment (or credit) to the reporter 10 and a deduction from the account of the subscriber 11.

Figure 8:
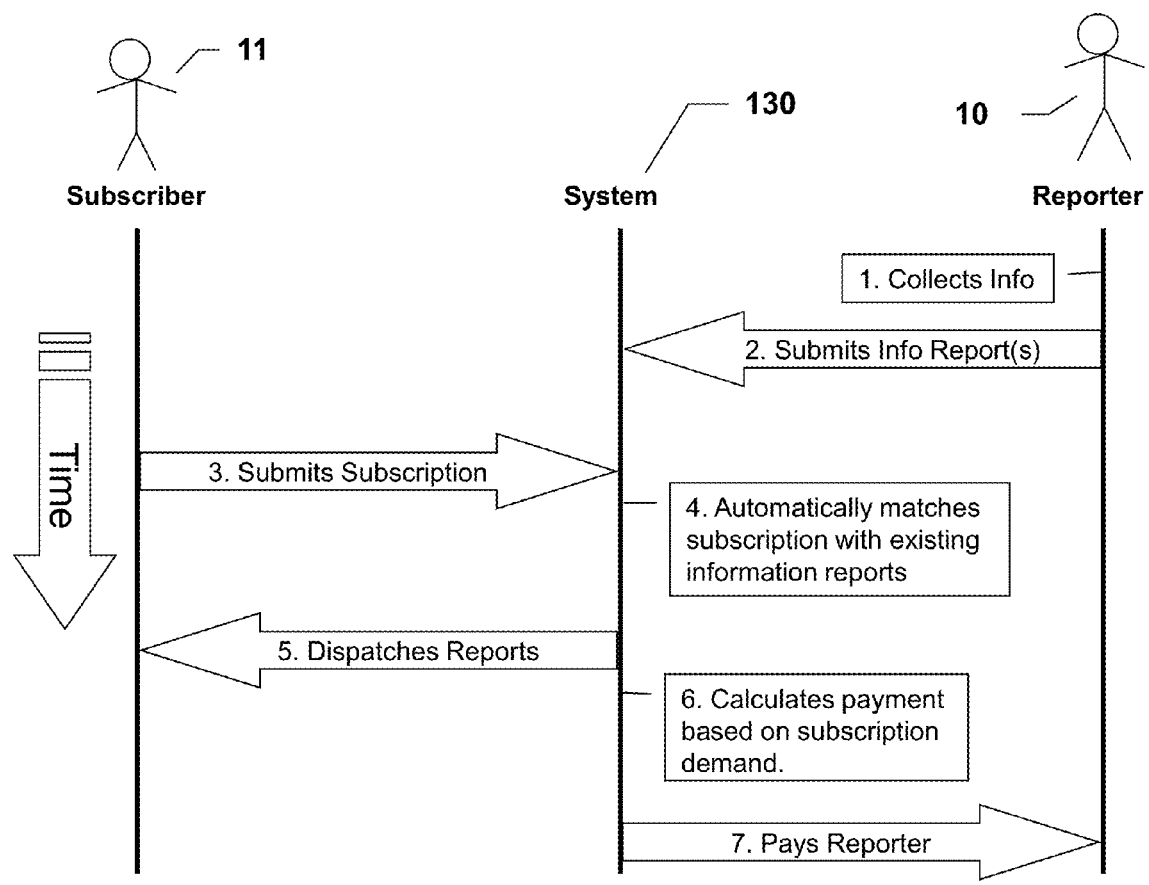
FIG. 8 illustrates an example human interaction diagram with the System highlighting immediate subscription satisfaction with existing information reports.

FIG. 8 illustrates an example human interaction diagram with the System 130 highlighting immediate subscription satisfaction with existing information reports. The illustration identifies the invention's logic and process of dispatching information reports based on pre-existing information reports resident in the RDBMS 140 of the System 130.

Step 1: The process begins with a reporter 10 collecting information based on a priori knowledge of expected information demands of future subscribers. For example, a fisherman may be out early in the morning catching fish of a particular species (e.g. Spadefish). Until that point in the day, no other fishermen have subscribed for catch information on Spadefish, instead wishing to try their luck without incurring the cost of a subscription.

Step 2: The first fisherman with recorded catches chooses to submit his catch data, regardless of the lack of tasking demand for his information. This is represented by reporter 10 submitting one or more reports to the System 130.

Step 3: As the hours wane, the unsuccessful fishermen choose to subscribe for any recent catch reports of Spadefish in their general vicinity. This is shown as subscriber 11 submitting an information-tasking subscription to the System 130.

Step 4: The System 130 automatically determines that existing reports satisfy the tasking constraints of the incoming subscription.

Step 5: The System 130 automatically dispatches the information reports to the subscriber 11 and a deduction is made from the account of the subscriber 11.

Step 6: The System 130 computes the payments due for each information report based on the aggregate information subscription demand. The timing of this action is based on tunable account settings (e.g. this may be done at the end of the day, week, or month, etc.).

Step 7: The System 130 issues an electronic payment (or credit) to the reporter 10.

FIG. 8 also identifies the logic and usefulness of the invention for motivating reporters to supply information reports without any current subscriptions. As an aggregate collection of information, the System 130 will create demand for future subscriptions (e.g. environmental studies), resulting in potential payouts (or credits) for reporters.

Figure 9:
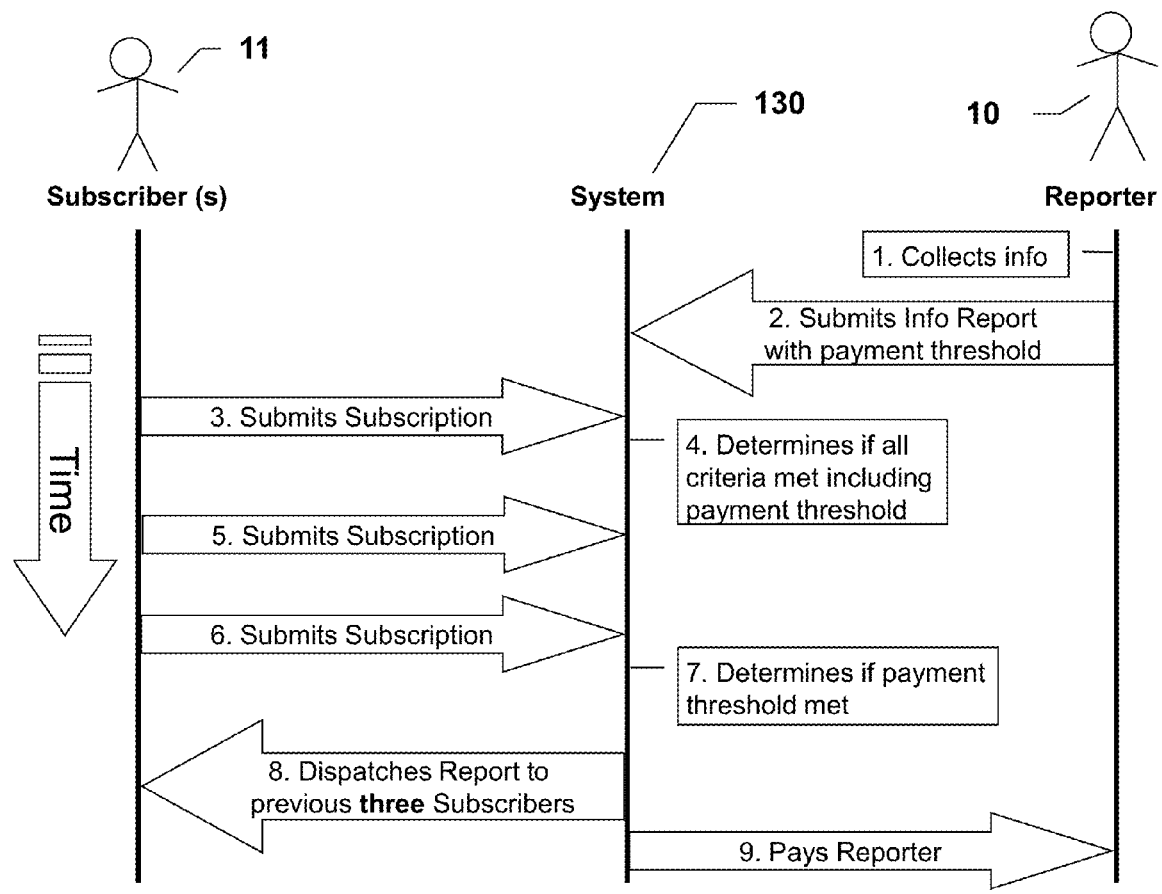
FIG. 9 illustrates an example human interaction diagram with the System highlighting an information report dispatch only after a reporter payment threshold has been satisfied.

FIG. 9 illustrates an example human interaction diagram with the System 130 highlighting an information report dispatch only after a reporter's minimum payment threshold has been met. The illustration identifies the invention's logic and process of dispatching information reports based on a reporter 10 minimum payment threshold included in an information report.

Step 1: The process begins with a reporter 10 collecting information based on a priori knowledge of expected information demands of future subscribers. The reporter 10 could also be responding to known tasking existing in the System 130.

Step 2: The reporter 10 submits an information report with a minimum payment threshold. The System 130 receives the information report and holds it until the typical domain, time range, and geospatial constraints are met, and additionally the minimum payout threshold has been met.

Step 3: Subscriber 11 submits an information-tasking subscription to the System 130 that meets the standard domain, time, and geospatial criteria, but fails to offer payment that equals or exceeds the minimum payout criteria of the information report.

Step 4: The System 130 begins to track aggregate subscription payout for the information report in queue.

Step 5: A second subscription is sent from a different subscriber 11. The information report in queue, matches all of the criteria of this tasking subscription, but fails again to dispatch because the aggregate sum of the two subscriptions has not met the minimum payout specified in the information report.

Step 6: Finally, a third subscription is sent, from a third subscriber 11. This information report in queue also meets the criteria for dispatch, but again fails, due to not meeting the individual payout threshold criteria of the report.

Step 7: Upon receiving this third subscription, the System 130 determines that the aggregate payout of all three subscriptions meets the minimum payout threshold of the information report. The System 130 also ensures that the information report time falls within the time range criteria of all three subscriptions.

Step 8: The System 130 dispatches the information report to all three subscribers 11 and deducts payment from each of their accounts.

Step 9: The System 130 issues an electronic payment (or credit) to the reporter 10 in an amount that equals or exceeds the minimum payout threshold specified in the submitted information report.

Figure 10:
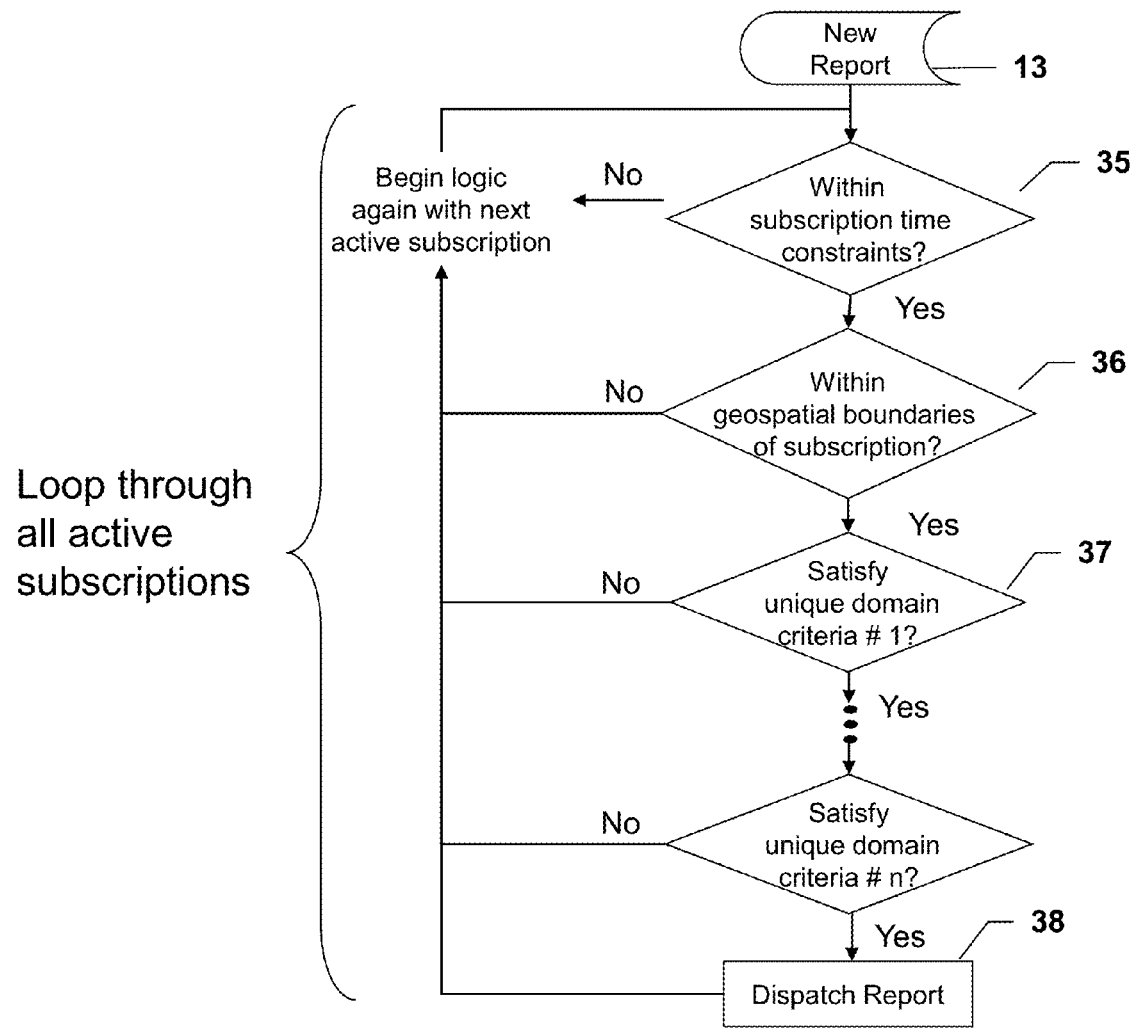
FIG. 10 illustrates the computer-implemented logic resident in the Dispatch Service.

FIG. 10 is a flowchart that identifies the example logic of an embodiment that would be implemented in the Dispatch Service 26 identified in FIG. 5. When a new report 13 is submitted into the System 130, the Dispatch Service 26 is notified 30 with the new report. The Dispatch Service 26 then puts the new report through logical tests against all active subscriptions within the domain, beginning with a time constraint test 35 followed by a boundary test 36. The new report and subscription then go through a series of domain criteria tests 37. For instance, in the birding domain, there could be a specific species test (e.g. Green Heron) and possibly a count of the number of this species observed (e.g. at least two or more observed) test. If all the tests succeed, the report would be dispatched to the subscriber in step 38. If any of these logical tests fail, remaining tests on the subscription end, and the testing begins anew with the next subscription in the active subscription list.

Figure 11A:
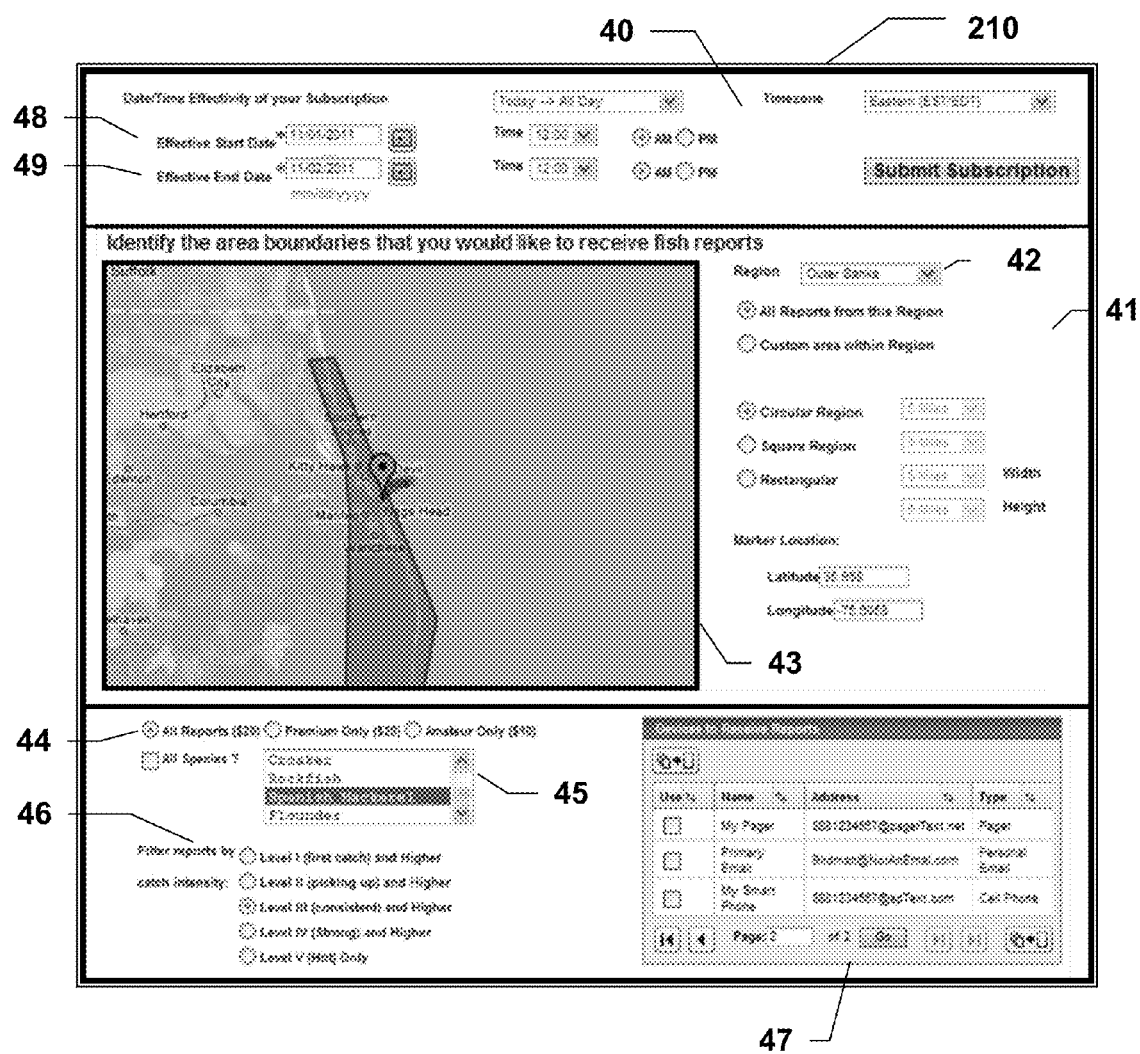
FIG. 11A illustrates an example of a Graphical User Interface (GUI) capable of accepting parameters that define a time-based geospatial information subscription.

FIG. 11A illustrates an example of a graphical user interface (GUI) capable of accepting a subscriber's specification for an information-tasking subscription. FIG. 11A provides an example for the Wildlife-Fish sub-domain. The GUI elements shown in area 40 of the web page 210 show how an effective time date range can be defined by the subscriber. Calendar user interface elements 48 and 49 illustrate the subscription's effective start and end dates. Area 41 of the web page shows how the geographical range criteria can be defined by the subscriber. Pre-defined regions can be selected from a drop-down list 42 resulting in the region being overlaid on a map element 43. Radio button group 44 illustrate graphical user interface elements that capture subscription criteria based on report type. List box 45 and radio group 46 illustrate the GUI elements enabling a subscriber to filter on specific domain criteria. Table 47 illustrates a mechanism for the subscriber to specify telecommunication devices and addresses to which they wish to receive dispatched reports.

The user interface elements shown in FIG. 11A are merely illustrative of a broad variety of interface elements and invention embodiments that may be used to capture subscriber specifications of a domain centric time-based geospatial report subscription.

Figure 11B:
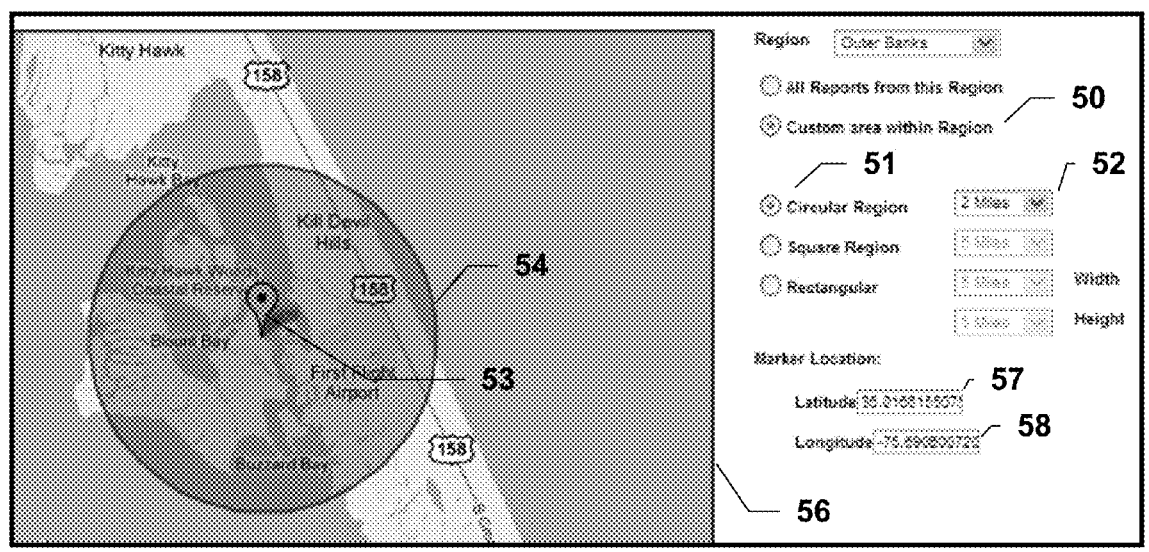
FIG. 11B illustrates additional graphical user interface mechanisms enabling a subscriber to define a geographic range to filter incoming reports.

FIG. 11B illustrates additional GUI mechanisms enabling a subscriber to define a geographic range to filter incoming reports. Radio group 50 shows how a subscriber can customize the shape of a geographic region by choosing a custom region vice the pre-defined geographic regions. Radio group 51 illustrates examples of three shapes, a circle, square, and rectangle, that a user can select to define the custom region. A marker 53 is shown that may be dragged and dropped on the map element 56. Text fields 57 and 58 display the respective latitude and longitude position of the marker 53. An overlay 54 is displayed on the map element 56 based on the shape type selected in the button group 51 and the radius selection from the drop down list 52.

Figure 12:
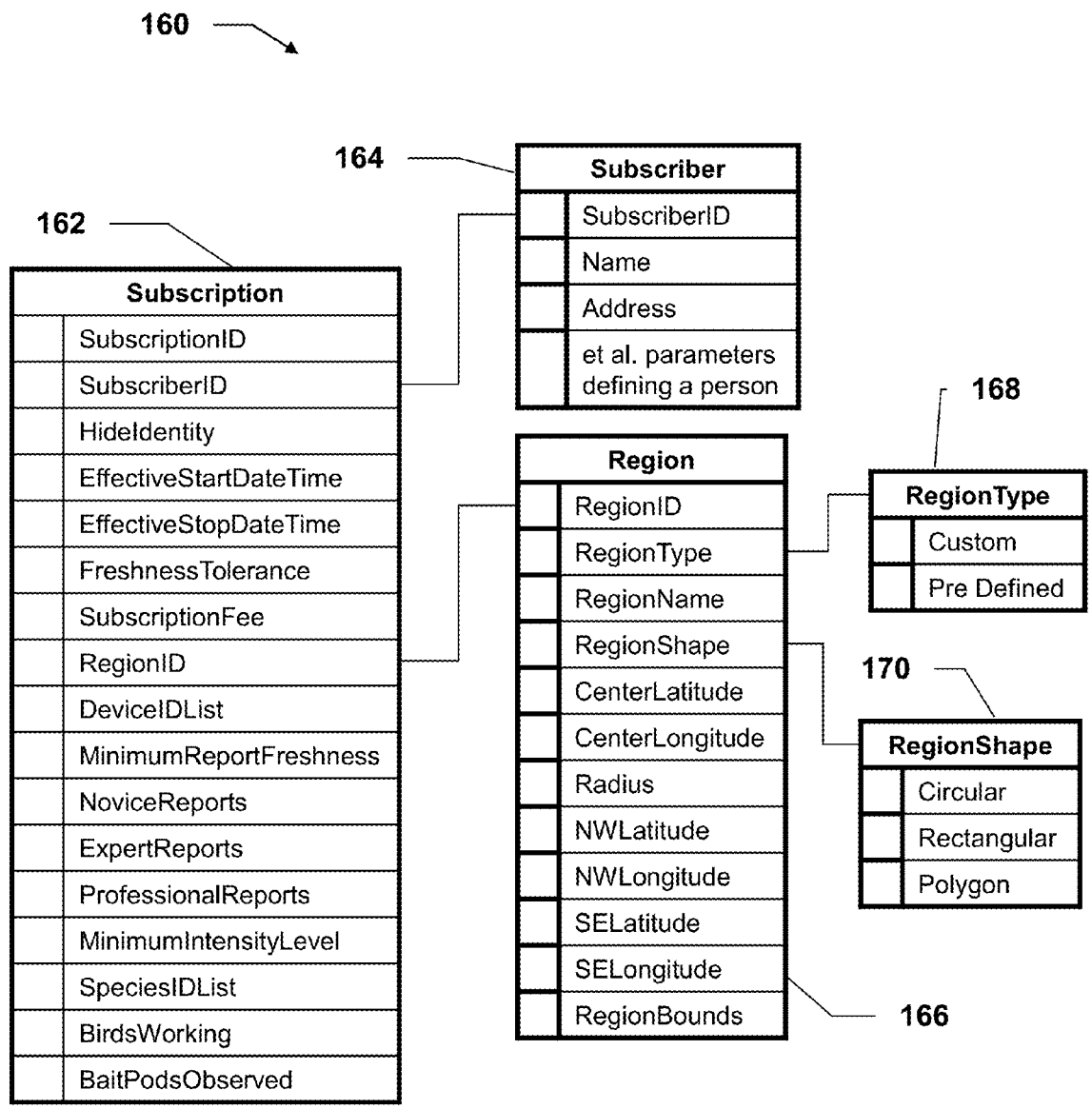
FIG. 12 illustrates relational database tables capable of storing an information-tasking subscription.

FIG. 12 is an illustration of five database schema tables 160 used in one embodiment of the invention to store data concerning an information-tasking subscription. The use of the term "column" in describing the rows of tables 160 refer to basic art term used for database schema design (i.e. when a table is implemented in a RDBMS, "columns" describe the values of data stored in rows). Although the illustration relates to the Wildlife-Fish sub-domain criteria illustrated in FIG. 11A, the concept may be tailored for other domains cited in the claims of this invention. Table 162 is used to store generic elements and unique domain constraints of a tasking subscription. Generic elements of Table 162 include the first ten (10) elements:
SubscriptionID
SubscriberID
HideIdentity
EffectiveStartDateTime
EffectiveStopDateTime
FreshnessTolerance
SubscriptionFee
RegionID
DeviceIDList
MinimumReportFreshness Unique domain constraint elements of Table 162 include the last seven elements:
NoviceReports
ExpertReports
ProfessionalReports
MinimumIntensityLevel
SpeciesIDList
BirdsWorking
BaitPodsObserved In another embodiment of this invention, the generic subscription elements are separated from the unique domain elements in separate tables.

Each subscription is assigned a unique SubscriptionID in the Subscription Table 162. Each subscription is associated with a person via the SubscriberID key which points to the Subscriber Table 164. Under an implementation of the invention, the HideIdentity column may be used to indicate the subscriber's preference that his identity be withheld from other users with regards to his subscription. The value assigned to the HideIdentity setting (either TRUE or FALSE) may be derived from system defaults, from default user account settings, and/or set via a GUI element (e.g. Boolean checkbox) at the time of the subscription submittal. The EffectiveStartDateTime and EffectiveStopDateTime store the time effectivity of the subscription. Use of the time duration stored in the Freshness Tolerance column is explained in the description of FIG. 6B. A SubscriptionFee column is used to store the "bounty" available to reporters for satisfaction of this tasking subscription. The geographic range constraints are captured via the RegionID column which points to a specific row of the Region Table 166.

Each geographic region is defined via the Region Table 166. Column RegionType of Region Table 166 identifies whether the region is pre-defined by the System 130 (e.g. "Outer Banks") or customer defined by a subscriber. Pre-defined custom shapes are selected by users as explained in the description of FIG. 11A. Custom region shape parameters are captured via the GUI elements explained in the description for FIG. 5. The shape of the region is specified by the RegionShape column with lookup values defined in the RegionShape Table 170. For regions of circular shapes, values will be stored in the CenterLatitude, CenterLongitude, and Radius columns of Table 166. For regions of rectangular shape, values will be stored in the NWLatitude, NWLongitude, SELatitude, and SELongitude columns of Table 166. For regions of polygon shapes, a series of latitude and longitude points will be stored in the RegionBounds column of Table 166.

The DeviceIDList in the Subscription Table 162 stores the subscriber's selection of devices (e.g. pager, phone, email. etc.) he wishes to receive information reports for this subscription. The list of database keys stored in this column point to a separate table of devices storing unique device information such as the device type, user device name, email address, text address, phone number, text limit, etc. As part of the profile creation that a subscriber performs when they enroll in the System 130, they add personal devices to their profile. During the subscription submission process, they are able to select from these pre-defined devices as shown in FIG. 11A, GUI table 47.

The MinimumReportFreshness column of Table 162 stores a generic information tasking constraint that may be used to limit acceptance of reports based on the time of the catch and the time when the report of the catch is submitted to the System 130. This is an important parameter that distinguishes institutional subscribers desiring bulk lower cost trending information from other subscribers willing to pay premiums for near-real time information reports. For example, a birder seeking to "score" an additional sighting needs only fresh and relevant sightings which would allow him to pursue and observe the same bird; whereas, an institutional research organization tracking bird migration patterns and population sizes does not require the report in real-time. The research institution is mostly concerned that the data of the information report is accurate (i.e. the date of the sighting is recorded appropriately), as opposed to the timing of the report's submission (e.g. the submission of the report could be made days, months, or years later).

The NoviceReports, ExpertReports, and ProfessionalReports columns of Table 162 store unique domain constraints that may be used to filter the acceptable quality (and/or trust) a subscriber is willing to accept. The columns store subscriber selections as shown in FIG. 11A, Radio Button Group 44. In this example embodiment, if a subscriber were to select "All Reports", Boolean settings for all columns would be set to TRUE. If the subscriber selected "Premium Only", the ExpertReports and ProfessionalReports columns would be set TRUE and NoviceReports set to FALSE. If the subscriber selected "Amateur Only", then NoviceReports and ExpertColumns would be set to TRUE and the ProfessionalReports column set to FALSE.

The SpeciesIDList column of Table 162 stores unique domain constraints that a subscriber may use to filter on fish species. The column stores the list of database keys that map to a FishSpecies table. In this example embodiment, the column captures the selections of the subscriber shown in FIG. 11A, list box 45.

The MinimumIntensityLevel column of Table 162 stores a unique domain constraint that limit fish catch report based on the "catch rate" of a fish catch report. The selection of this parameter is shown in FIG. 4, radio button group 46. FIG. 13C drop down list 86 shows the corresponding GUI element that records the fish catch rate by a reporter.

The BirdsWorking column of Table 162 stores a unique domain constraint that a subscriber may use to filter fish catch reports only when the observed catch is accompanied with the observation that birds are "working" (aka feeding).

The BaitPodsObserved column of Table 162 stores a unique domain constraint that a subscriber may use to filter fish catch reports only when the observed catch is accompanied with the observation that schools of smaller fish (i.e. bait pods) are observed in the water column (this is typically done through the fish catch reporter's sonar device).

Figure 13A:
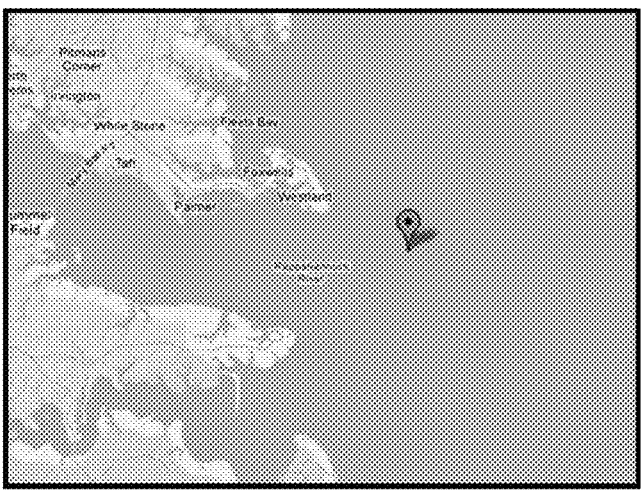
FIG. 13A illustrates a web page capable of collecting an information report for a Wildlife Domain/Fish Catch sub-domain.

FIG. 13A illustrates a web page 66 capable of collecting an information report for a Wildlife-Fish Catch sub-domain. Three distinct sections of the web page are identified. Section 60 of the page illustrate graphical user input elements that capture the "eye witness" time aspects of the report. Section 61 of the page illustrates the GUI elements providing the capability for a reporter to tag the geospatial aspects of the event (additional details of the elements are explained in FIG. 13B). Section 62 of the page illustrate GUI elements capable of collecting specific sub-domain metadata associated with a report. Section 62 is explained in greater detail in the description for FIG. 13C. Button 63 provides a mechanism to submit the report with all its metadata to the report service 21 (shown in FIG. 5). In addition to the reporter's time, the System 130 also captures the submission time, thus providing time relevancy metadata with the report.

Figure 13B:
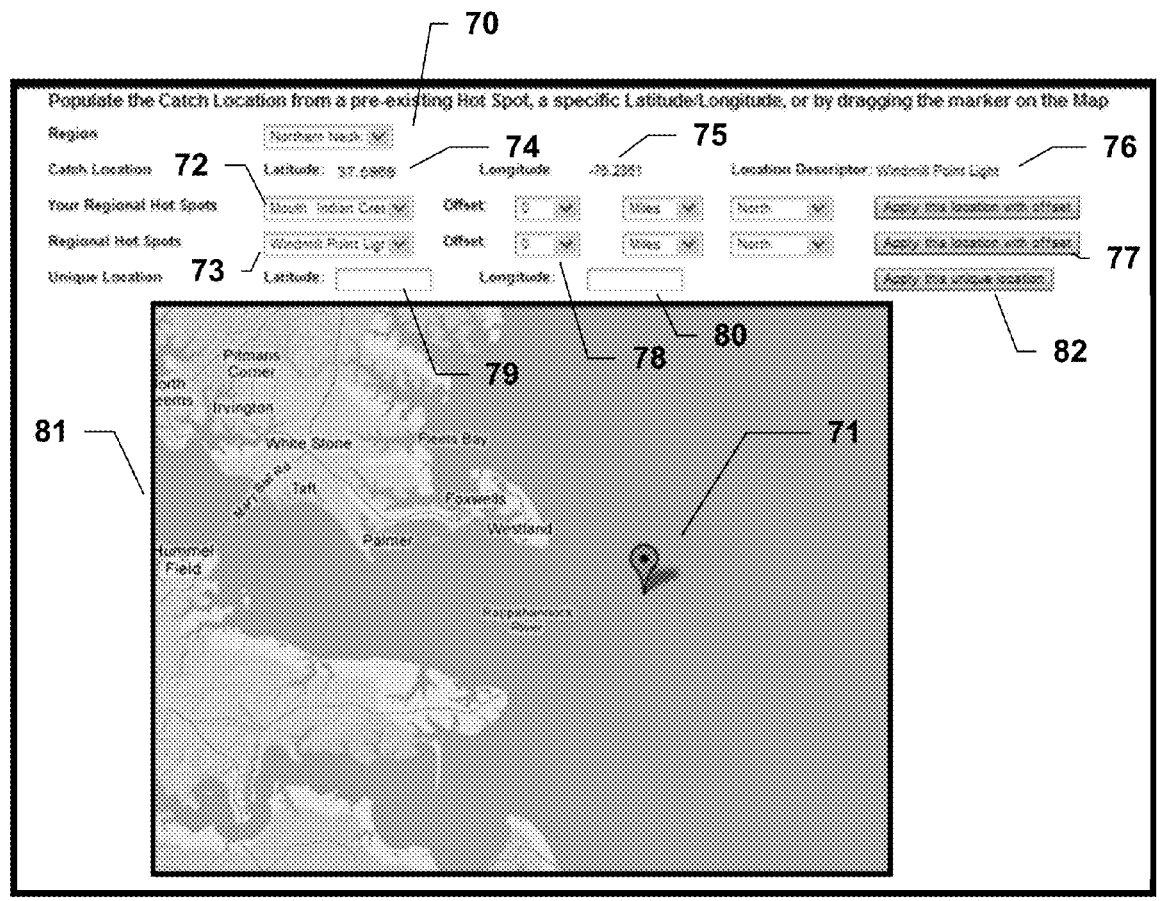
FIG. 13B illustrates GUI elements capable of specifying the geo-spatial aspects of a report.
Figure 13C:
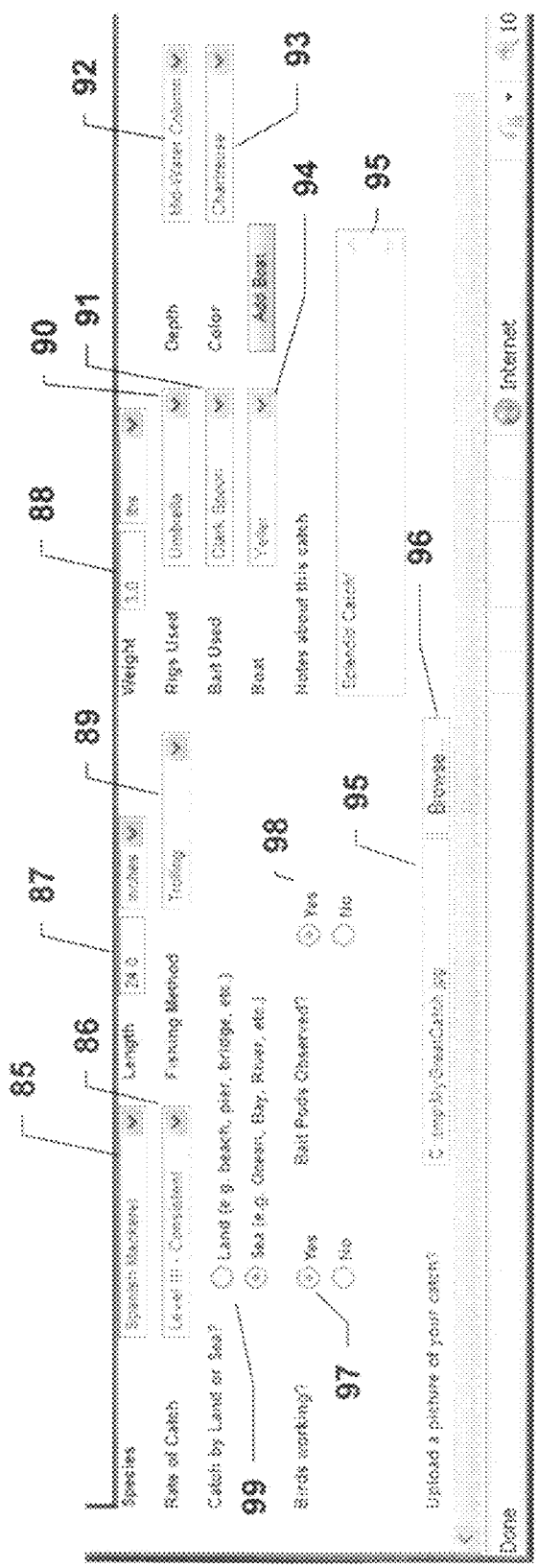
FIG. 13C illustrates GUI elements capable of enabling a reporter to document domain metadata for a particular report.

FIG. 13B illustrates section 61 of the web page 66 of FIG. 13A, providing additional details regarding the GUI elements capable of specifying the geospatial aspects of a report. A drop down list 70 shows how a reporter can select a unique pre-defined geospatial region where the observed event occurs. Based on the region selection, the reporter is able to select a pre-defined location via the drop down lists 72 and 73. The locations in the drop down list 72 are unique reporter defined locations that the reporter maintains via personal reporter settings. Locations provided via drop down list 73 are those defined by the System 130 as most common to all reporters of the region. An offset to these locations can be applied, as shown via the drop down list 78. Upon selecting the "Apply this location with offset" button 77, the marker 71 would move to the correct latitude and longitude on the map element 81 and update the text fields 74 and 75 with the calculated latitude and longitude. The location descriptor text field 76 provides the description of the location. In the case of an offset to a landmark, the description field 76 would indicate the offset (e.g. 5 miles north of Windmill Point Light). The text description submitted with the report (in addition to the latitude and longitude), may be used within the associated dispatch message of the report.

A marker 71 displayed on the map element 81 provides the reporter the ability to drag and drop a marker at the precise location of the event, in this example, a fish catch. The unique latitude and longitude location would be shown in text fields 79 and 80, respectively. The reporter may then apply the locations via the "Apply this unique location" button 82. Under another implementation of this interface, the location may be automatically populated in the GUI from the estimated location of the input device (e.g. GPS enabled smartphone, et. al. location lookup features).

FIG. 13C illustrates section 62 of FIG. 13A. FIG. 13C provides additional details regarding the GUI elements capable of enabling a reporter to document domain metadata for a particular report. FIG. 13C illustrates example metadata that could be collected Wildlife Domain/Fish Catch sub-domain. Drop down list 85 illustrates how a reporter can record the fish species caught. Drop down list 86 illustrates how the reporter can record the intensity of fish catching. Text fields 87 and 88 illustrate how a reporter can document the length and weight of the fish species caught. Drop down lists 90, 91, 92, and 93 illustrate pre-defined metadata selections that enable a reporter to record certain aspects of the fishing techniques employed for the reportable fish catch. Drop down list 94 illustrates pre-defined reporter metadata associated with the reporters fishing platform (e.g. boat name). Text field 95 shows how a reporter may enter in free flowing text information with regards to this specific report. Button 96 illustrates a mechanism for a reporter to select a picture of their catch for report submission. The pathname and filename of the picture to be submitted with the report is shown in a read-only text field 95. Radio button selection groups 97, 98, and 99 illustrate additional metadata selections that are submitted with a fish catch report.

The metadata selections shown in FIG. 13C are stored in the central database with each report. The stored metadata enables the System 130 to generate canned reports, text messages, and alerts.

Figure 14:
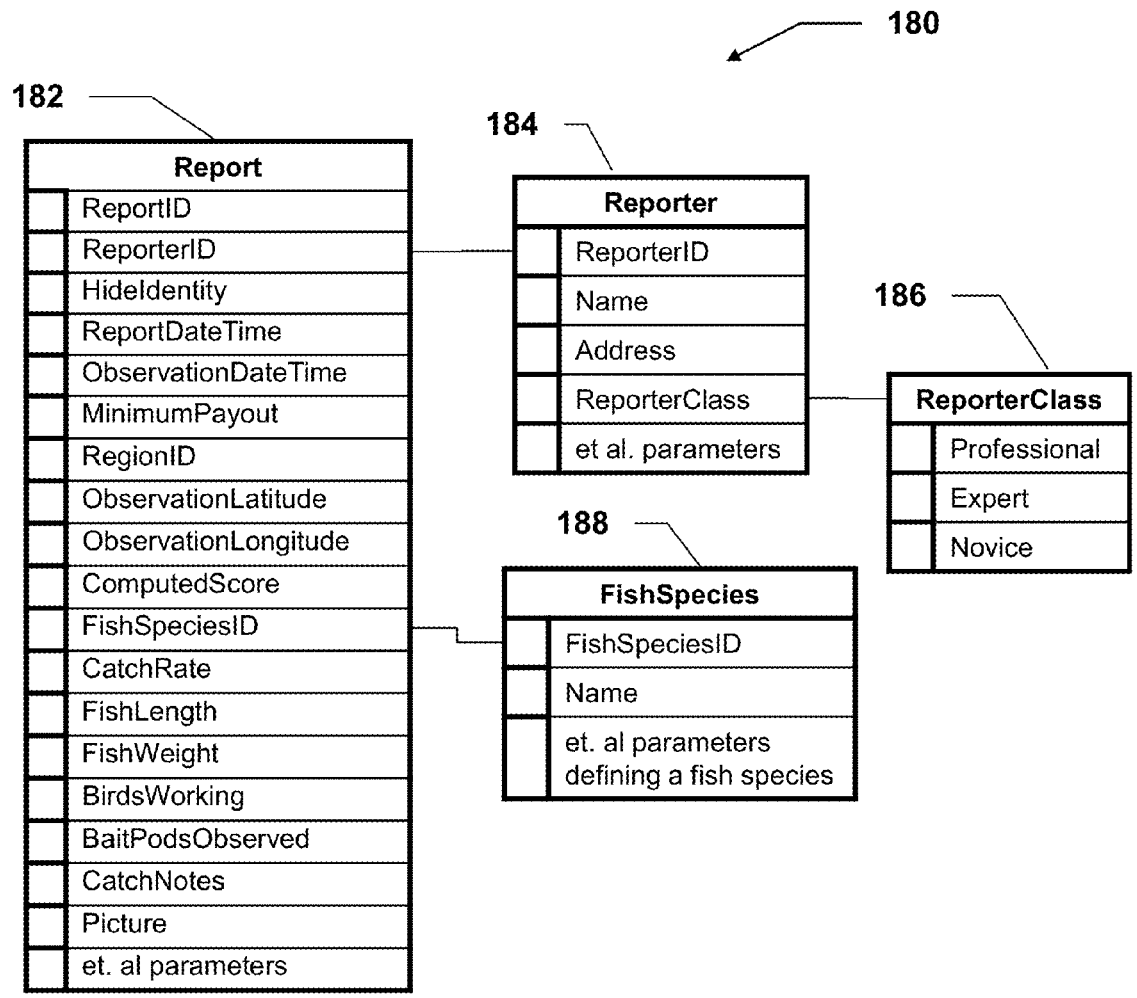
FIG. 14 illustrates relational database tables capable of storing a domain unique information report.

FIG. 14 is an illustration of four database tables 180 used in one embodiment of the invention to store data concerning an information report. Although the illustration relates to the example of the Wildlife-Fish sub-domain illustrated FIG. 13C, the concept may be tailored for other domains cited in this invention. Table 182 is used to store generic elements and unique domain metadata of an information report. Generic elements of Table 182 include the first ten columns:

- ReportID
- ReporterID
- HideIdentity
- ReportDateTime
- ObservationDateTime
- MinimumPayout
- RegionID
- ObservationLatitude
- ObservationLongitude
- ComputedScore The remaining columns of Table 182 illustrate examples of unique domain metadata of the information report.

In another embodiment of this invention, the generic subscription elements are separated from the unique domain elements in separate tables.

Each report is assigned a unique ReportID in the Report Table 182. Each report is associated with a person via the ReporterID key which points to the Reporter Table 184. Under an implementation of the invention, the HideIdentity column may be used to indicate the reporter's preference that their identity be withheld from other users with regards to the submission of the report. The TRUE/FALSE setting may be derived from System 130 defaults, from default user account settings, and/or set via a GUI element (e.g. Boolean checkbox) at time of the information report submittal. The time of the report submission as determined by the System 130 is stored in the ReportDateTime column of Table 182. The observation time, or for this example, the date and time of the catch, is stored in the ObservationDateTime column of Table 182. A minimum payment threshold that the reporter may specify is stored in the MinimumPayout column of Table 182. The RegionID column of Table 182 stores the pointer to a pre-defined region (as shown in FIG. 12) from which the reporter has recorded the observation (or in this domain example, recorded a catch). The ObservationLatitude and ObservationLongitude columns of Table 182 identify the reporter's location of the observation (for this example, the location of the catch).

The ComputedScore column of Table 182 stores a System calculated score based on several factors of the information report. The score is calculated differently for each domain based on the concept of tunable weights and scaled criteria. An example embodiment formula is as shown:

$$\frac{\sum_{i=1}^{N} ScaledCriteria_i \cdot Weight_i}{N}$$

ScaledCriteria in the invention may be defined from generic aspects of the report submission as well as defined from unique domain metadata from the report. The following three scaled criteria examples are derived from generic factors each scaled between 0 and 5:

A Reporter Satisfaction Rating scaled between 0 and 5, where the rating is derived from user feedback from previous report submissions Reporter Class:
- 5: Professional Reporter with 100 or more submitted reports
- 4: Professional Reporter with less than 100 submitted reports
- 3: Expert Reporter with 100 or more submitted reports
- 2: Expert Reporter with less than 100 submitted reports
- 1: Novice Reporter with more than 20 submitted reports
- 0: Novice Reporter with less than 20 submitted reports Report Freshness (measure of lag time-based difference between report submission time and observation time:
- 5: lag time<5 minutes
- 4: 5 minutes≤lag time<10 minutes
- 3: 10 minutes≤lag time<20 minutes
- 2: 20 minutes≤lag time<40 minutes
- 1: 40 minutes≤lag time<60 minutes
- 0: lag time greater than or equal to an hour The following is a scaled criteria example from the Wildlife-Fish sub-domain. The criteria is scaled between 0 and 5:

Catch Rate:
- 5: Red hot feeding frenzy
- 4: Excellent
- 3: Consistent
- 2: Catches Picking Up
- 1: First Catch
- 0: Not catching The invention has the ability to incorporate other scaled criteria such as scaling the length and weight of the fish based on fish species. The invention does not limit itself to the number of scaled criteria.

Table 210 shown in FIG. 15 illustrates an example embodiment of a tunable weighting table used in the ComputedScore formula. Via the RDBMS of the invention, the weights of each criteria can be modified (i.e. tuned) to produce relative scores that represent the relative value of information reports to subscribers.

The unique domain metadata columns of Table 182 are used to map observable data inputs from the reporter into the RDBMS. The FishSpeciesID column in Table 182 is an example that maps to the fish species selection GUI drop down list 85 shown in FIG. 13C. Other elements from the GUI example of FIG. 13C are also shown in Table 182. As necessary, table elements are keyed to relational database tables such as the FishSpeciesID column of Table 182 and the FishSpecies Table 188. The Reporter Class column Table 184 is keyed to the lookup Table 186.

Figure 16:
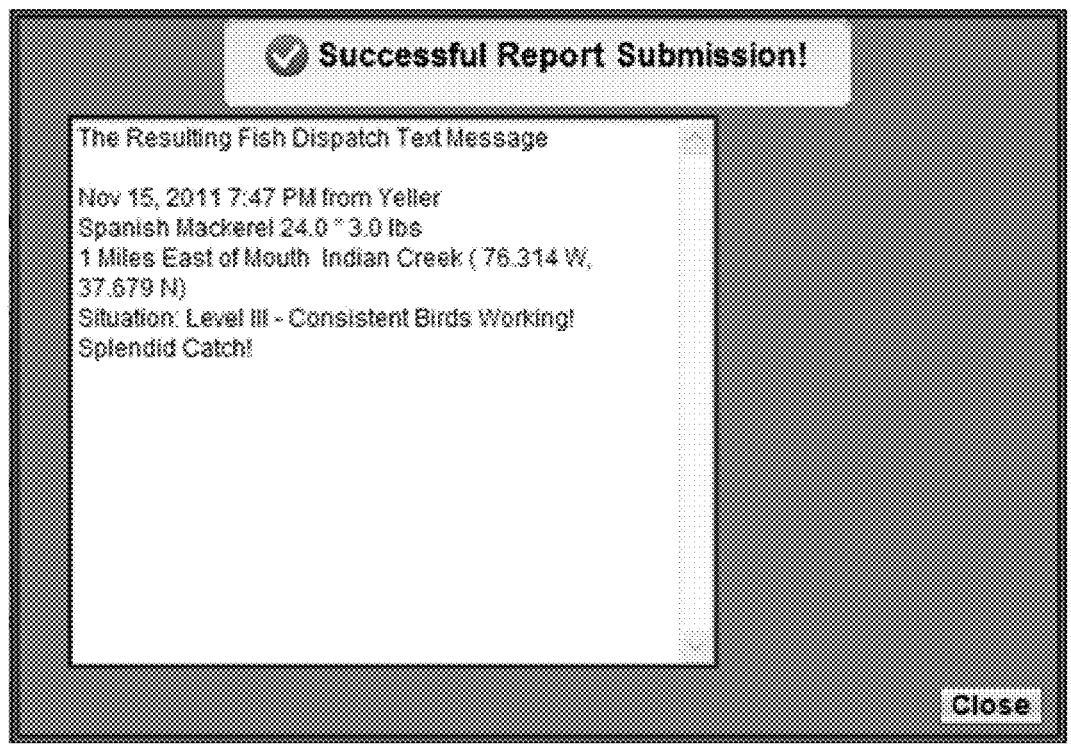
FIG. 16 illustrates a computer-generated text message created from the metadata submitted with a fish catch report.

FIG. 16. illustrates an example embodiment of a computer-generated text message created from the metadata submitted with a fish catch report.

The stored metadata associated with reports enables the System 130 to generate filters available to subscribers to limit (or expand) the type of reports they wish to receive. For example, drop down list 86 that documents the rate of catch (aka fishing intensity), allows a subscriber to only receive reports that meet a certain desired threshold of fishing intensity.

Although the illustration in FIG. 13C illustrates metadata pertaining to a fish catch report, the concept of defining and tailoring specific metadata for other various domains and providing GUI elements with pre-defined metadata attributes are unique to this invention.

Figure 17:
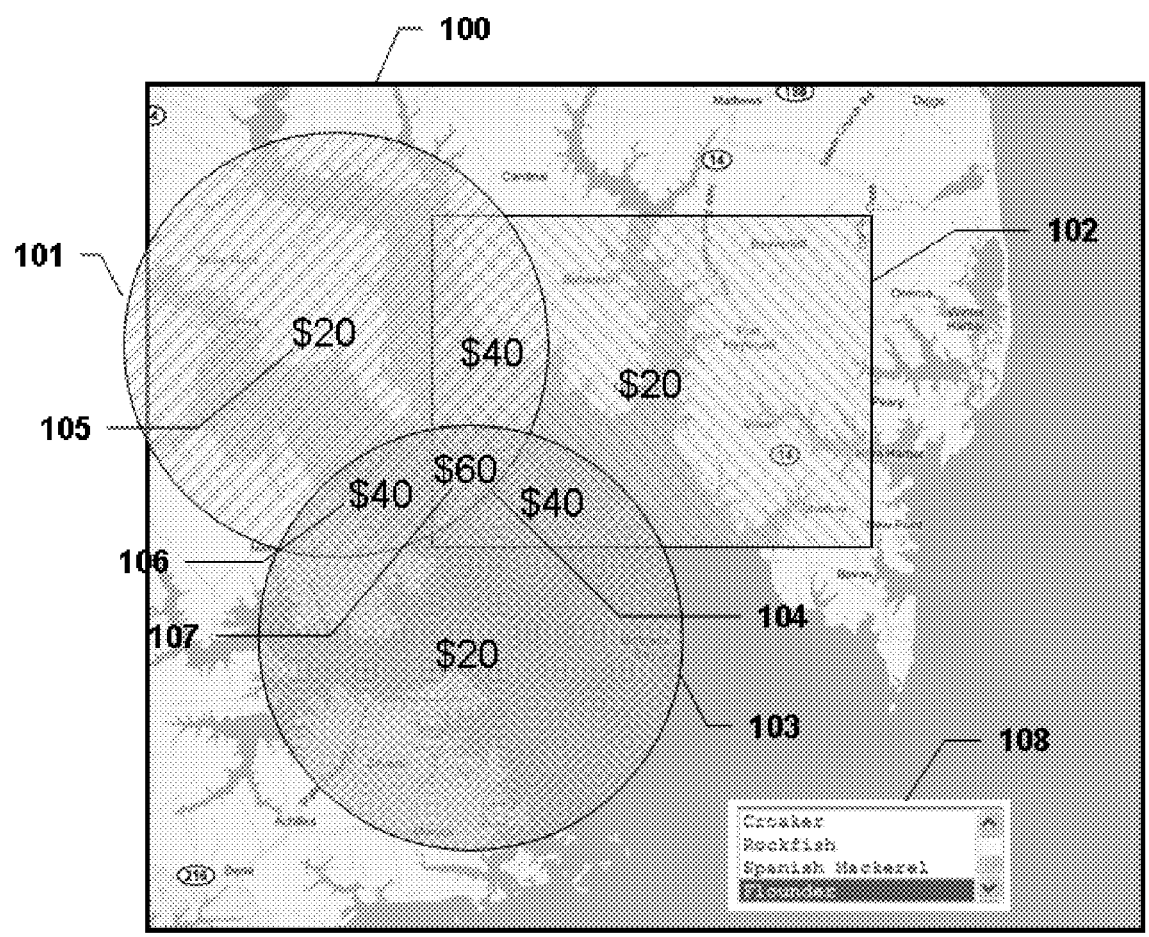
FIG. 17 illustrates the ability of the invention to simultaneously overlay multiple information-tasking subscription ranges on a map.

FIG. 17 illustrates the ability of the invention to simultaneously overlay geographic boundary criteria from multiple subscriptions on a map. FIG. 17 provides an example from the Wildlife Doman, Fish Catch sub-domain. Item 100 is an example map element showing an area of interest to a particular fish catch reporter. List box 108 provides a mechanism for the reporter to view aggregate active subscription demand based on a fish species selection, in this example, "Flounder". The circle subscription range 101, rectangular subscription range 102, and circle subscription range 103 are all simultaneously overlaid on the map element. The three subscription ranges represent the range selections of interest of active and identical domain metadata subscriptions (i.e. fish species, Flounder). The ability of the invention to overlay this data based on the composite subscription metadata from the central database system allows a reporter to visualize locations where an observation might maximize his payout for a particular report, thus increasing demands for reports.

Following the Wildlife-Fish sub-domain example, circular region 101 shown with the label 105, and $20, in the center of the region, indicates to the reporter that his report of a caught Flounder within the region 101 could potentially earn $20. Likewise, a report of a Flounder in the two intersecting regions 101 and 103 could earn $40 as shown by label 106. Area 104, created by the intersection of regions 101, 102, and 103 contain the label 107, $60, which indicates the maximum bounty that can be earned for a reported Flounder catch.

Although FIG. 17 shows these overlays by patterns in gray scale, it is not limited to the use of colors, heat map techniques, and other methods for displays that show subscription demand. Although FIG. 17 shows labels using dollar figures, the invention is not limited in its use, or of the type of currency used or displayed.

Figure 18:
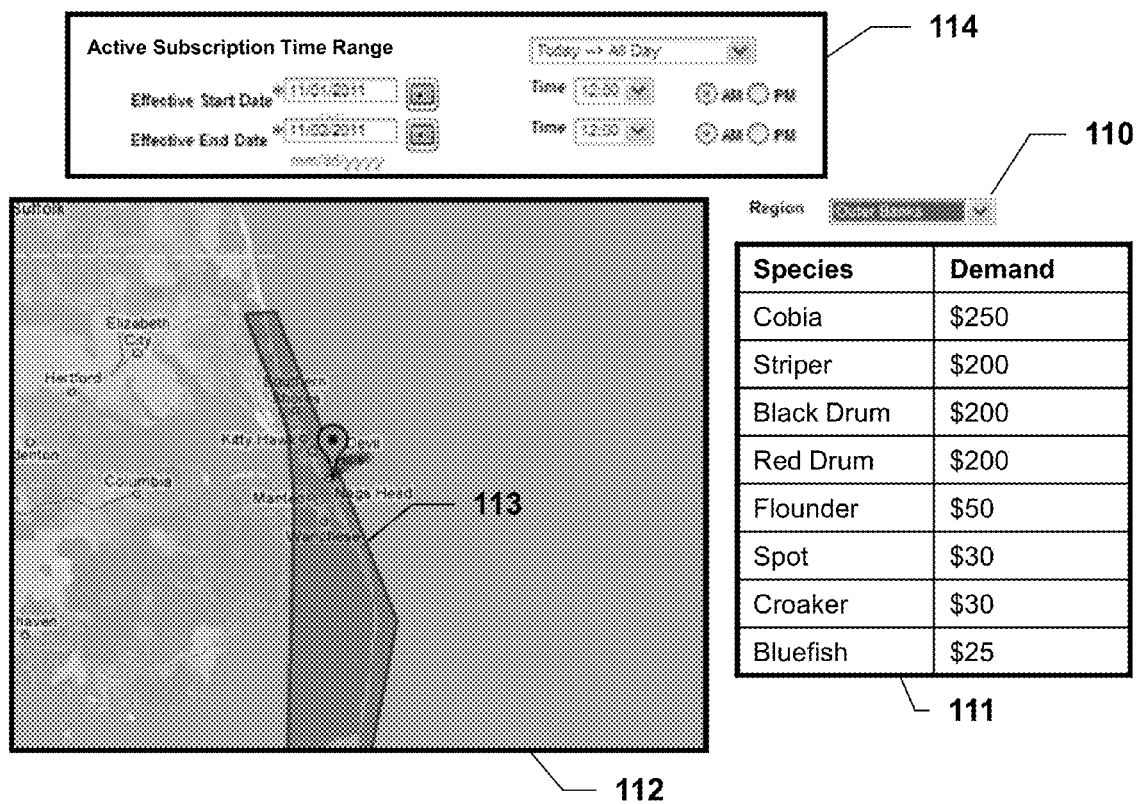
FIG. 18 illustrates an example of a graphical user interface (GUI) capable of reporting active subscription demand based on selection of time range, pre-defined regions, and domain metadata.

FIG. 18 illustrates an example of a graphical user interface (GUI) capable of reporting active subscription demand based on selection of time period, pre-defined regions, and domain metadata. It shows the utility of the invention for soliciting information reports based on information subscriptions. FIG. 18 provides an example from the Wildlife-Fish Catch sub-domain. GUI elements shown in 114 allow the reporter to select the period of interest to view active subscription demand. Drop down list 110 is used to select the pre-defined region of interest. Map element 112 displays the context of the pre-defined region 113. Table 111 displays the aggregate active subscription demand by species.

Figure 19:
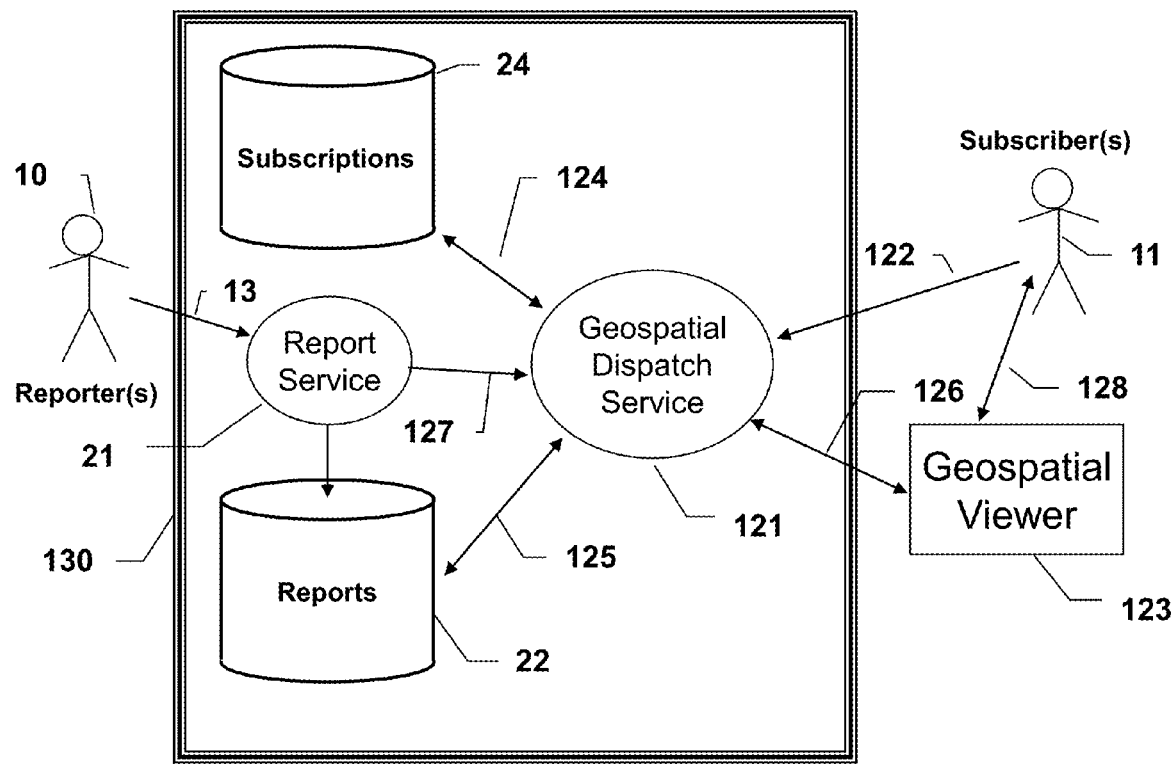
FIG. 19 illustrates an example implementation of a geospatial dispatch service communicating with a geospatial viewer.

FIG. 19 illustrates an example implementation of a Geospatial Dispatch Service 121 communicating with a geospatial awareness viewer 123. A geospatial awareness viewer in this illustration may be any map, maritime chart, or imagery-based system or device capable of displaying map/chart/imagery data with other metadata (e.g. Google Earth, MapQuest, etc.). The invention does not limit itself to a specific geospatial awareness viewer or the platform (e.g. PC, smartphone, etc.) on which it runs. Line 128 represents the interactions a subscriber has with the geospatial awareness viewer. Logical tables of a Relational Database Management System (RDBMS) shown respectively as items 22 and 24 are identical to those explained in FIG. 2. A geospatial viewer 123 (e.g. Google Earth) is shown interacting with the Geospatial Dispatch Service 121 via defined application program interfaces 126 (e.g. Google Earth Network Links). Based on the subscriber's 11 privileges, paid services, geospatial and domain metadata filtering selections 122, the interface 126 to the Geospatial Viewer is created and maintained for the subscriber's session. The invention creates the capability for subscribers to maintain geospatial information awareness "Battlespaces" for their domain and metadata criteria selections of interest. As information reports 13 are submitted to the System 130, the Report Service 21 notifies the Geospatial Dispatch Service 121, which in turn updates the customized link (stream) 126 to the Geospatial Viewer 123. The subscriber 11 may then view reports live via Geospatial Viewer 123. Because the data provided by the System 130 is time stamped, sliding time window controls on the Geospatial Viewer enable the user to hide and display reports based on the observation time of the original information reports.

Figure 20:
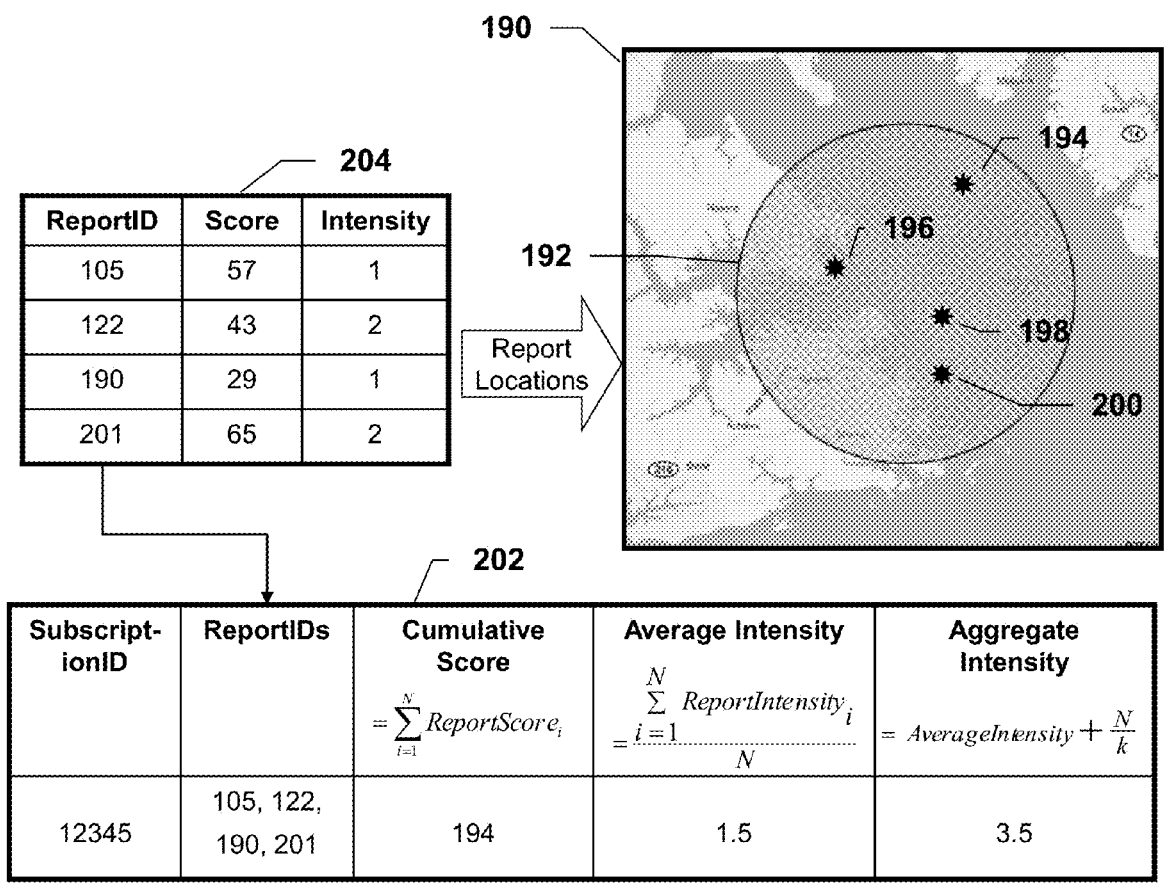
FIG. 20 illustrates an example implementation of the invention to dispatch information reports based on aggregate criteria computed from multiple information reports.

FIG. 20 illustrates an example implementation of the invention to dispatch information reports based on aggregate criteria computed from multiple information reports. The figure identifies a map element 190 where a subscriber has created a subscription for fish catches within the circular geographic bounds 192. The subscription is stored in the database with the SubscriptionID of 12345 with a minimum intensity setting of 3 (i.e. Consistent Catch Rate). During the course of twenty minutes, the System 130 receives four different catch reports with locations as shown on the map element as stars 194, 196, 198, and 200. A subset of the metadata for each of the reports is shown in Table 204. As can be seen, each of the reports lie within the circular range 192 of the subscription, but neither of the reports meet the intensity threshold of the subscription. In one embodiment of the invention, the Dispatch Service 26 (from FIG. 5) creates a memory object 202 called an aggregate report. This could also be implemented using a database table in other invention embodiments. The aggregate report object 202 begins to track the individual reports coming into the System 130 which have met geographic range, time constraints, and other domain criteria, but fail to satisfy the subscription based on score and/or intensity thresholds. The SubscriptionID field of the memory object maps to the SubscriptionID created upon submission to the Subscription table 162, shown in FIG. 12. The ReportIDs field of memory object 202 stores the list of ReportID indexes of the matching reports shown in Table 204.

The cumulative score shown in the memory object 202 is computed using the following formula:

$$= \sum_{i=1}^{N} ReportScore_i$$

where N is the total number of filtered reports. The cumulative score of the reports is cited here because it can serve as a filtering criteria for information-tasking subscriptions.

Average Intensity is calculated using the standard formula:

$$= \frac{\sum_{i=1}^{N} ReportIntensity_i}{N}$$

where ReportIntensity is the intensity merit supplied with an individual information report submission. N is the total number of reports having met the time and geospatial constraints of the subscription tasking. For this example implementation, ReportIntensity is the same as the value stored in the CatchIntensity column shown in FIG. 14 of the Report database table 182.

An aggregate intensity value is computed as defined by the following formula:

$$= AverageIntensity + \frac{N}{k}$$

where N is the total number of reports, and k is a system tunable parameter.

When k=2, the aggregate intensity of the four reports, shown in table 204 of FIG. 20, computes to 3.5. This would result in a dispatch of a four report aggregate (i.e. one report compiled from the information of all four reports) to the subscriber based on the aggregate intensity calculation. As the value of k increases (i.e. tune the System), the aggregate intensity increases at a slower rate for each additional report, thus resulting in a greater number or common "observations" being received by the System 130 before an aggregate report is dispatched.

The concept and logic of the invention illustrated by FIG. 20 is intended to show that the invention has the ability to logically calculate when the cumulative effect of multiple observations closely spaced in time and space indicate activity not provided by single information reports. The utility of this invention feature spans many information domains cited in this invention's claims. The invention does not limit its implementation to using other formulas, weightings, and tunable parameters for making calculated aggregate report dispatch decisions.

Figure 21:
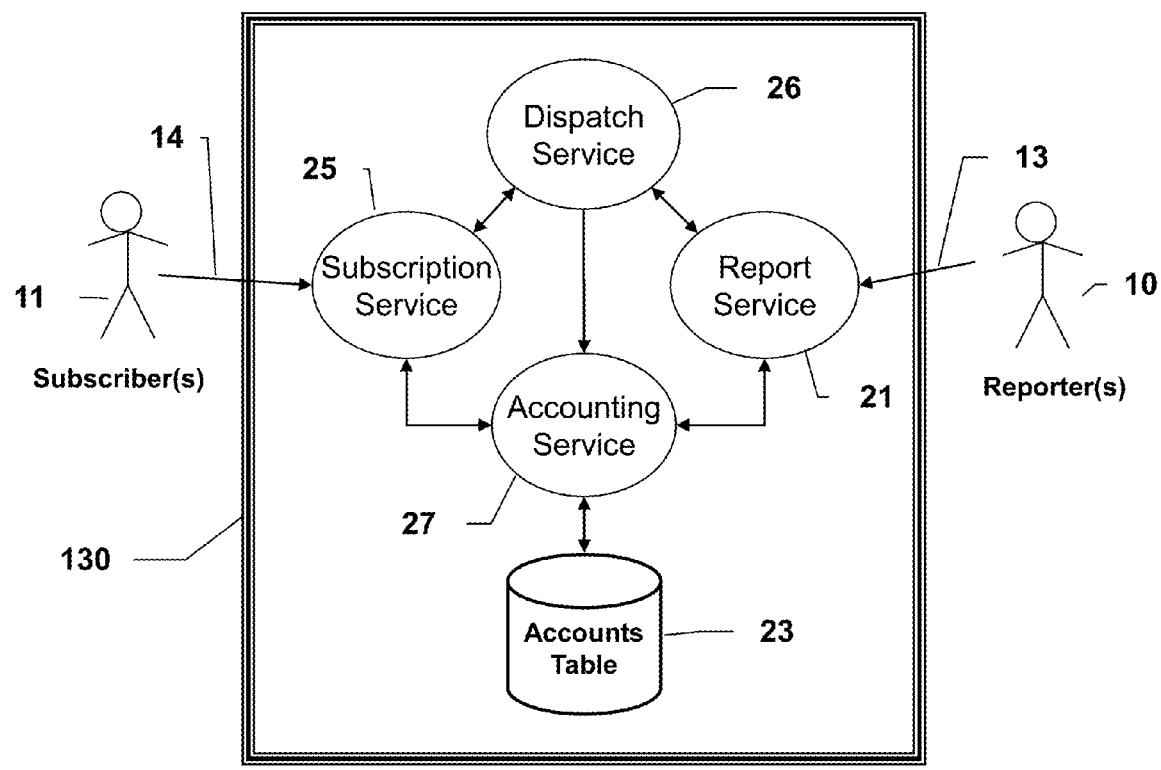
FIG. 21 illustrates an example implementation of the accounting services within the computer-based tasking, collection, and dispatch system.

FIG. 21 illustrates an example implementation, in one embodiment of the invention, the accounting services within the computer-based tasking, collection, and dispatch System 130. The figure illustrates an Accounting Service 27 that communicates with both the Subscription Service 25, Report Service 21, and the Dispatch Service 21. The figure shows the Accounting Service 27 updating and retrieving data from the Accounts Table 23 of the RDBMS. The Accounting Service 27 provides computer-implemented logic to debit the accounts of subscribers 11 upon fulfillment of information-tasking subscriptions 14 and to credit the accounts of reporters 10 for dispatched information reports.

Figure 22:
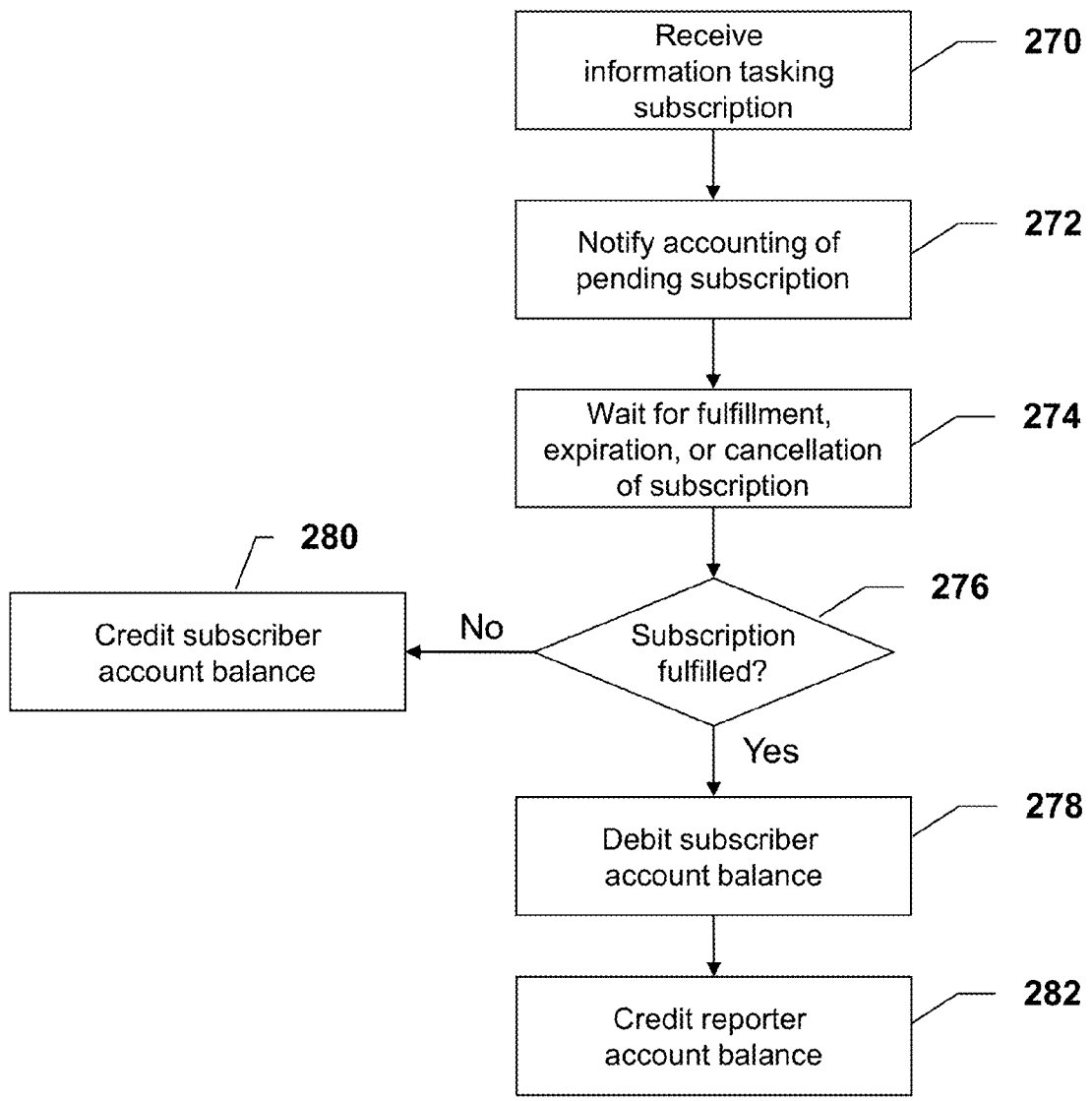
FIG. 22 is a flowchart illustrating the logic used to perform accounting for received information-tasking subscriptions.

FIG. 22 is a flowchart illustrating the logic used in one embodiment of the invention to perform accounting for received information-tasking subscriptions. The process begins with step 270 in which the Subscription Service 25 (of FIG. 21) receives a new information-tasking subscription. In step 272 the Subscription Service 25 notifies the Accounting Service 27 (of FIG. 21) of a pending subscription. In Step 274 the Accounting Service 27 places pledged payment credit (for the tasking) on hold until the information-tasking subscription is either fulfilled by a report, its time effectivity expires, or the subscription is cancelled by the subscriber. If the subscription is fulfilled in Step 276, the subscriber's account is debited by the pledged amount in the information-tasking subscription, followed by step 282 where the reporter's account is credited by an amount determined via the computer-implemented logic of the Accounting Service 27. If the subscription is not fulfilled in Step 276, the subscriber is issued a credit for the pledged amount from the subscription as indicated in Step 280.

FIG. 23 is an illustration of a database table schema 290 used in one embodiment of the invention to store financial account information for both subscribers and reporters. The UserID column maps to the ReportID and SubscriberID columns from the Reporter table 184 and the Subscriber database table 164. The user's account balance is maintained in the Balance column. When a subscription is received by the System 130, the TotalSubscriptionPledges is updated by the pledged amount of the subscription (as explained in step 272 of FIG. 22). The Accounting Service 27 via communication with the Subscription Service 25 prevents subscribers from submitting additional subscriptions in which their total tasking pledged payouts would exceed their current balance.

Figure 24:
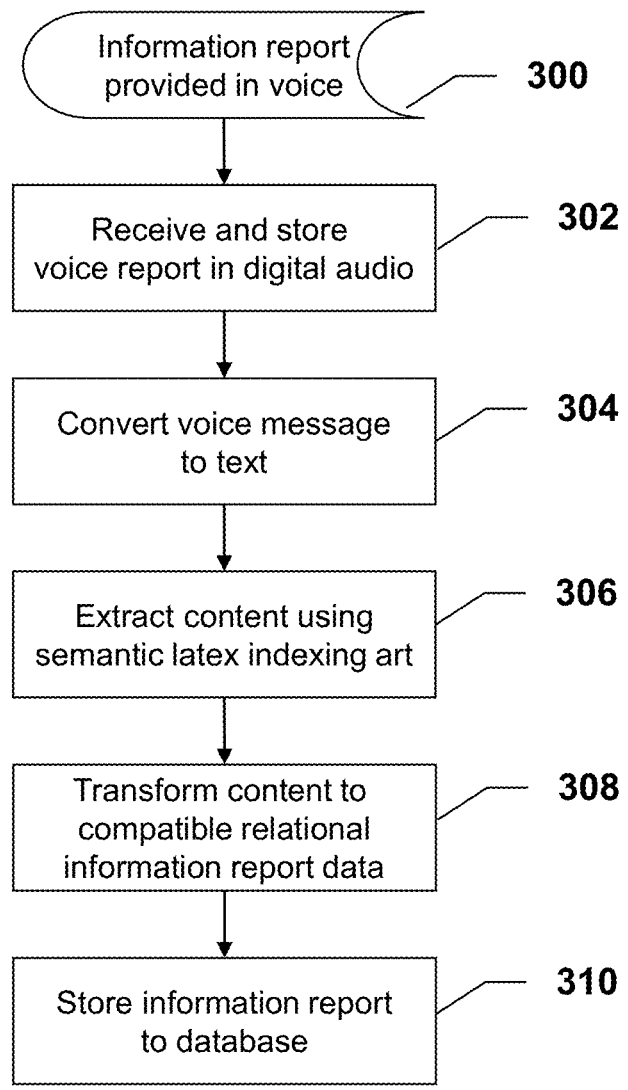
FIG. 24 is a flowchart illustrating the process to transform information reports received in voice to contextual relational information reports capable of being stored to the RDBMS.

FIG. 24 is a flowchart illustrating the process used in one embodiment of the invention to transform information reports received in voice to contextual relational information reports capable of being stored to the RDBMS. The process begins with step 302 in which the System 130 receives a new information report in voice. The voice message may be received by a reporter calling into a voice mail system housed within the System 130 or delivered as an attached audio file accompanies by a typical information report submission. In step 302, the time stamps are applied to the report and the report is stored in its original raw format. In step 304, existing art is used to convert the digital audio voice file to text. In step 306, the text file is extracted for content using existing semantic latent indexing art. The invention does not limit itself to using only semantic latent indexing art. In step 308, the extracted content is transformed into relational data consistent with the schema definitions of an information report 182 as illustrated in FIG. 14. The process ends in step 310 when the report is stored to the RDBMS.

I claim:

1. A system for tasking, collecting, and dispatching information reports via an electronic communications network, comprising:
   a. a computer-implemented central relational database system for storing information reports that are time tagged, geospatially tagged, and characterized with domain unique descriptive metadata that may include text, pictures, video, and audio;
   b. a computer-implemented central relational database system for storing various information tasking subscriptions comprised of time-based constraints, geospatial constraints and other domain unique criteria constraints;
   c. computer-implemented services that generate information tasking subscriptions based on information tasking subscription criteria from subscribers;
   d. computer-implemented services for receiving incoming information reports from information reporters who may provide those reports electronically via electronic communication device through which information reporters document and transmit observations;
   e. computer-implemented services that compare the information tasking subscription criteria with incoming information reports, determine whether a report of the incoming information reports satisfies the information tasking subscription criteria, and dispatch the reports over a communications network to devices as designated by the information tasking subscriptions;
   f. computer-implemented services that dispatch information reports according to the information tasking subscription criteria when aggregate subscription demand, as indicated by a time-based geospatial aggregate bounty, exceeds specified payout minimum thresholds attributed to the information report;
   g. computer-implemented services that compute the time-based geospatial aggregate bounty threshold based on aggregate demand of information tasking subscriptions by:
      i) calculating geospatial areas as geospatial combinations of overlapping areas from the information tasking subscriptions with matching criteria; and
      ii) computing and assigning demand values to the geospatial areas by summing the demand values of the respective subscriptions that were used to form the geospatial area;
   h. computer-implemented services that display the geospatial areas and aggregate subscription demand associated with information subscriptions having similar criteria for the geospatial areas;
   i. computer-implemented services that distribute geospatial information reports, based on the incoming information reports, to geospatial viewing computer applications residing on subscriber devices.

2. The system of claim 1, further comprising:
   computer-implemented services that display aggregate report information in a geospatial and time-based context.

3. The system of claim 1, further comprising:
computer-implemented services that score incoming information reports based on a weighted formula.

4. The system of claim 1, wherein geospatial information reports are distributed to subscribers electronically in various formats including, but not limited to, text messages, emails, computer to computer communications, phone calls, and broadcast satellite subscription service feeds.

5. The system of claim 1, further comprising:
computer-implemented services for communicating to users over an electronic communications network the demand levels of desired information reports based on aggregate subscription demand using domain, sub-domain, metadata criteria, specified geographic bounds, applicable time range, and economic value.

6. The system of claim 1, further comprising:
computer-implemented services for reporters to subscribe and receive alerts with regards to information tasking, with capabilities:
  a. that communicate individual and aggregate information tasking subscription demand in a geospatial and time based context;
  b. that enable a reporter to filter information tasking based on domain and sub-domain metadata criteria, specific geographic bounds, applicable time range, and payout values; and
  c. that enable a reporter to subscribe to and proved filter criteria of information tasking based on their dynamic location.

7. The system of claim 1, further comprising:
computer-implemented services for reporters to specify minimum payouts for an information report that restricts dispatch of the report to information subscribers until information tasking demands equal or exceed the specified minimum payout.

8. The system of claim 1, further comprising:
computer-implemented services to collect fees for information subscription tasking, attributes the fee to the subscription, aggregates fees based on matching subscription criteria, and electronically pays information reporters for satisfaction of supplied information reports.

9. The system of claim 1, wherein time and geospatial information in an information report is vetted with electronic signature parameters of the communications device, to include, but not limited to, built in GPS parameters, latitude and longitude via embedded location look up services, built in time stamps, phone number, cellular tower metadata, cellular handset identifiers (e.g. IMSI, IMEI, MSN), network MAC address, network IP address, and built in biometric signatures.

10. The system of claim 1 wherein the information report may be vetted to include, but not limited to, using image processing of attached pictures, video processing of attached video, and audio processing of audio included with a report.

11. The system of claim 1 wherein the information report is submitted to the system in voice, transformed to text, and content extracted for relational storage in the central relational database system.

12. The system of claim 1 wherein the information report documents:
a) the domain of nature and wildlife (e.g. flora and fauna), to include, but not limited to, bird sightings, fish catches, fish schools, whale observations, unique and/or exotic species sightings, legally targeted species for hunting, animal species for safari sightings, active migrations, unusual animal sightings, unique animal behavior, tracked and/or tagged animals, unusual animal behavior sightings, rabid animal sightings, dangerous animal sightings, predatory animal sightings, missing animal or pet sightings, flora budding and blossoming events;
b) the domain of human activity, culture, politics, religion, and sports, to include, but not limited to, movie star sightings, sports star sightings, VIP sightings, errant spouse sightings, missing person sightings, lost child sightings, status of ongoing sport's game, results of a sport's game, restaurant menu offerings, available tables at a restaurant, status of available swim lanes, status of available golf tee times, status of available public tennis court, status of a ski lift line, status of ski slope conditions, show times, disease outbreak, and political events;
c) the domain of criminal behavior, to include, but not limited to, suspicious or criminal behavior, kidnapping, illegal poaching, illegal immigrant sightings, drunk driver sightings, driver illegally texting, car jacking, pirating, airline hijackings, pedophile sightings, graffiti markings, illegal drug use, illegal drug dealing, illegal drug crops, trespassing, illegal deforestation, criminal escapee sightings, deadbeat father and/or mother sightings, stolen artwork, shoplifting, stolen automobile, water usage violations, and suspicious gun discharges;
d) the domain of natural phenomenon, to include, but not limited to, weather events such as tornadoes, hurricanes, flash floods, first snow flakes, snow depths, rain gauge readings, earthquakes, tsunamis, typhoons, water spouts, mud slides, thunderstorms, lightning strikes, forest fires, geyser eruptions, volcanoes, shooting stars, comets, aurora borealis (aka northern lights), aurora australis (aka southern lights), solar eclipse, lunar eclipse, tidal water levels; stream, lake, and reservoir levels; ocean surf conditions, water quality, river flows, glacier movement, coral reef health, and lava flows;
e) the domain of transportation, to include, but not limited to, automobile traffic events, unique automobile sightings, particular airplane/aircraft sighting, train car sighting, ship sighting; any watercraft sighting to include ships, sailboats, small watercraft, arrival events, departure events, in transit events, baggage events, and delay events;
f) the domain of commerce, to include, but not limited to, yard and/or garage sales, flea markets, unique items of interest for sale found at public places of commerce, and new product availability;
g) the domain of industry and agriculture, to include, but not limited to, observed plantings, harvestings, pollutant discharges, deforestation, livestock locations, lost farm animals, and crop status;
h) national and international security threat domain events, to include, but not limited to, terrorist attacks, IED sightings, military movements, car bombings, naval movements, military transportation sightings, missile launches, genocide, human trafficking, illegal border crossings, civil unrest, protests, strikes, weapons proliferation, and weapons of mass destruction activities;
i) the domain of man made disasters, to include, but not limited to oil spill slick locations, oil spill deposits on beaches and shorelines, nuclear fallout readings, oil spill seepage in a river or stream, pollutant discharges, algae blooms, and unusual gas smells;
j) the infrastructure domain, to include, but not limited to location of power outages, road erosion, bridge erosion, roadway pot holes, inclement road conditions, roadway blockages, road closures, checkpoints, speed traps, gas leaks, water pipe bursts, water main breaks, tower (electrical, telecommunications, water) damage, bridge damage, dam or spillway damage, gas and oil pipelines, railway infrastructure, building damages, tower locations, and tower installations, and construction progress.

13. The system of claim 1 wherein the aggregate subscription demand can be displayed via the following geospatial techniques, but not limited to, value based contour maps, Venn diagrams, color gradient maps, and pattern based maps.

14. The system of claim 1 wherein aggregate subscription demand can be displayed via a value based contour map with the capability to display the contours based on, but not limited to, information criteria filters, contour resolution, specified pre-defined geospatial regions, specified custom geospatial bounds, and currency.

15. The system of claim 1 wherein the computer-implemented services can compute and display aggregate average subscription bounty value over a user specified geospatial area.

16. The system of claim 1 wherein computer-implemented services can function as a market making system, providing tunable features that fill the financial gap between aggregate subscription demand and minimum report payout criteria.

17. The system of claim 1 wherein computer-implemented services can compute aggregate subscription demand by factoring in dynamic geographical areas prescribed in a subscription based on the dynamic location of the subscriber.

18. The system of claim 1 wherein information reports and the absence of submitted reports against outstanding information subscriptions are used in combination with other data, to include, but not limited to, tides, currents, winds, weather, and other natural phenomena, in order to provide predictive analytics of future events for fixed and mobile information subscribers.

19. The system of claim 1 wherein computer-implemented services can make pro-rated payouts from aggregate subscription demand to reporters based on a computed quality score that factors the timeliness of the submitted report as compared with other reports also satisfying the same information subscription criteria.

20. The system of claim 1 wherein computer-implemented applications on external computer-based communication devices that provide methods for reporters to document their observations and transmit them to the system over an electronic communications network.

21. The system of claim 1 wherein computer-implemented applications on external computer-based communication devices that provide methods for subscribers to enroll information tasking subscription criteria and transmit subscriptions to the system over an electronic communications network.

22. The system of claim 1 wherein computer-implemented services provide the ability to compute and display Venn diagram like geographic areas resulting from the intersection of geographic areas associated with information subscriptions having similar criteria based on user selectable filter criteria to include, but not limited to applicable time range.

23. The system of claim 1 wherein computer-implemented services possessing the capability to hide the identity of an information reporter from information tasking subscribers as requested by the reporter providing the information report.

24. The system of claim 1 wherein computer-implemented services possessing the capability to hide the identity of information tasking subscribers from external users of the system as requested by the information tasking subscriber.

* * * * *